US012343892B2

(12) United States Patent
Moss et al.

(10) Patent No.: US 12,343,892 B2
(45) Date of Patent: Jul. 1, 2025

(54) POWER TOOL ACCESSORIES FOR CUTTING ELONGATED MEMBERS

(71) Applicant: BLACK & DECKER INC., New Britain, CT (US)

(72) Inventors: Darren B. Moss, York, PA (US); Marco Lourenco, Baltimore, MD (US); Thomas R. Kaye, Jr., Fallston, MD (US); James Batterden, Timonium, MD (US)

(73) Assignee: BLACK & DECKER INC., New Britain, CT (US)

( * ) Notice: Subject to any disclaimer, the term of this patent is extended or adjusted under 35 U.S.C. 154(b) by 736 days.

(21) Appl. No.: 17/453,671

(22) Filed: Nov. 5, 2021

(65) Prior Publication Data

US 2022/0143858 A1    May 12, 2022

Related U.S. Application Data

(60) Provisional application No. 63/263,403, filed on Nov. 2, 2021, provisional application No. 63/176,601, filed
(Continued)

(51) Int. Cl.
*B26D 3/16* (2006.01)
*B25F 3/00* (2006.01)

(52) U.S. Cl.
CPC ............... *B26D 3/169* (2013.01); *B25F 3/00* (2013.01)

(58) Field of Classification Search
CPC ...... B23D 29/00; B23D 29/02; B23D 29/005; B23D 29/026; B23D 35/00; B23D 35/002;
(Continued)

(56) References Cited

U.S. PATENT DOCUMENTS

| 1,346,997 A | 7/1920 | Van Berkel |
| 2,504,018 A | 4/1950 | Gibson et al. |

(Continued)

FOREIGN PATENT DOCUMENTS

| CN | 205190663 U | 4/2016 |
| CN | 107599663 A | 1/2018 |

(Continued)

OTHER PUBLICATIONS

Extended European Search Report, EP Application No. 21206984.3, Apr. 11, 2022, 8 pages, EPO.

*Primary Examiner* — Jennifer S Matthews
(74) *Attorney, Agent, or Firm* — Scott B. Markow

(57) ABSTRACT

A power tool accessory includes a housing having a rear end portion and front end portion; an input shaft at least partially received in the rear end portion, extending along an axis, and configured to be coupled to a tool holder of a rotary power tool; a threaded shaft received in the housing and rotationally driven by the input shaft; a blade holder configured to move along the axis upon rotation of the threaded shaft; and a cutting blade configured to be retained by the blade holder. A workpiece holder is coupled to the front end portion of the housing and is configured to hold an elongated member. Upon rotation of the input shaft, the threaded shaft rotates, causing the blade holder to move axially toward the front end portion of the housing, causing the blade to move at least partially into the workpiece holder to cut the elongated workpiece.

40 Claims, 35 Drawing Sheets

Related U.S. Application Data on Apr. 19, 2021, provisional application No. 63/112,478, filed on Nov. 11, 2020.

(58) Field of Classification Search
CPC .... B23D 35/005; B23D 35/008; B23D 21/00; B23D 21/06; B23D 21/145; B26B 15/00; B26D 3/169; B26D 3/16; Y10T 83/0896
See application file for complete search history.

(56) References Cited

U.S. PATENT DOCUMENTS

| | | | |
|---|---|---|---|
| 3,008,156 A | 11/1961 | Davison | |
| 3,199,193 A | 8/1965 | Norty | |
| 3,965,572 A | 6/1976 | Strybel | |
| 4,026,028 A | 5/1977 | Green | |
| 4,266,437 A | 5/1981 | Obergfell | |
| 4,292,833 A * | 10/1981 | Lapp | H02G 1/00 72/416 |
| 4,483,222 A | 11/1984 | Davis | |
| 4,712,302 A | 12/1987 | Diller | |
| 4,747,212 A | 5/1988 | Cavdek | |
| 5,195,390 A | 3/1993 | Nogaki | |
| 5,245,982 A * | 9/1993 | Trudeau | B28D 1/222 125/12 |
| 6,467,172 B1 | 10/2002 | Jenq | |
| 6,938,531 B2 | 9/2005 | Yushimizo et al. | |
| 7,351,010 B1 * | 4/2008 | Kelly | F16L 1/166 405/158 |
| 9,701,032 B2 | 7/2017 | Moss et al. | |
| 2009/0030791 A1 | 12/2009 | Schlosser | |
| 2009/0307910 A1 * | 12/2009 | Schlosser | B26D 3/169 83/54 |
| 2010/0043609 A1 * | 2/2010 | Franze | B23D 21/06 83/13 |
| 2016/0023289 A1 * | 1/2016 | Moss | B25F 3/00 30/500 |
| 2016/0271781 A1 * | 9/2016 | Kobayashi | F16H 25/20 |
| 2020/0180049 A1 * | 6/2020 | Frenken | B23D 29/00 |

FOREIGN PATENT DOCUMENTS

| | | | | |
|---|---|---|---|---|
| CN | 207578532 U | * | 7/2018 | |
| DE | 10154061 A1 | | 5/2003 | |
| GB | 2516296 A | * | 1/2015 | ......... B23D 57/0061 |
| JP | 3172554 B2 | | 6/2001 | |
| JP | 2004001159 A | | 1/2004 | |

* cited by examiner

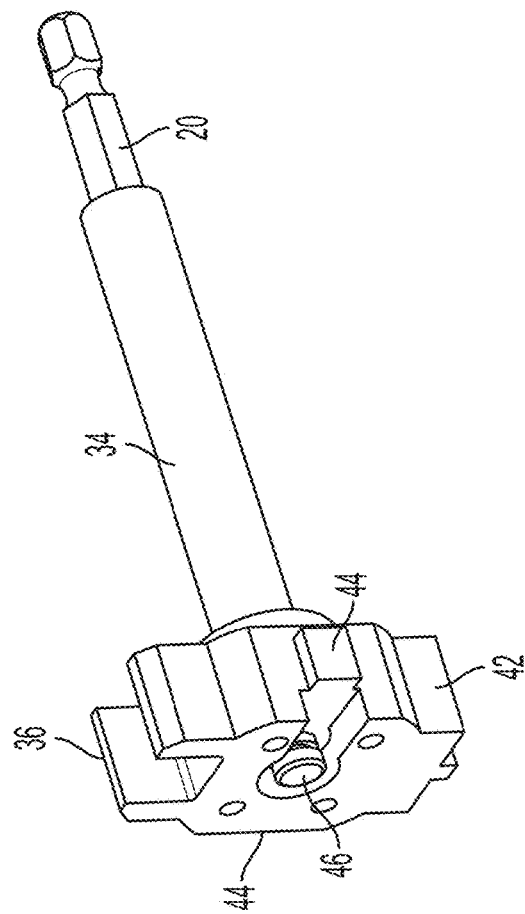
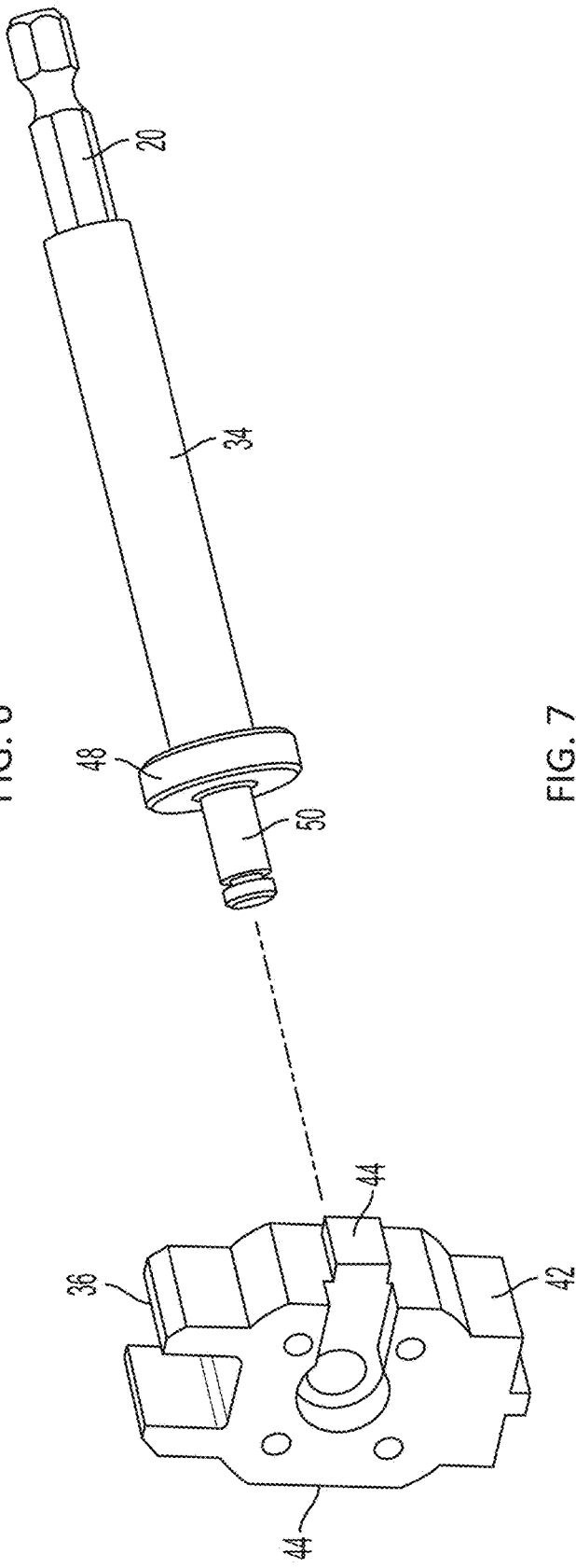
FIG. 6
FIG. 7

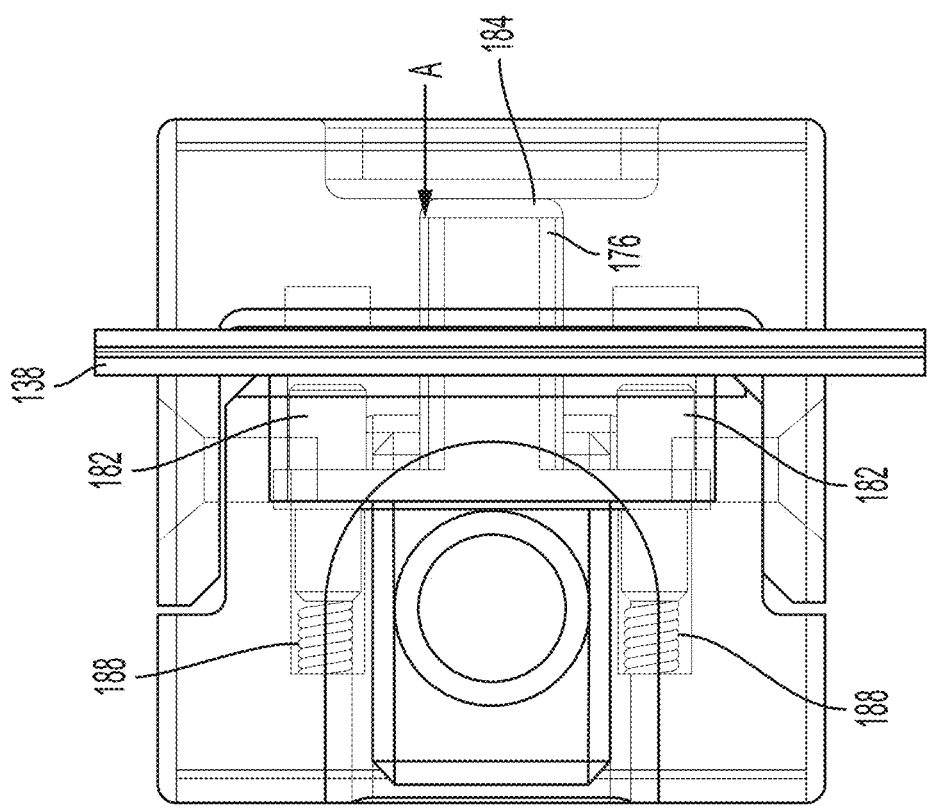
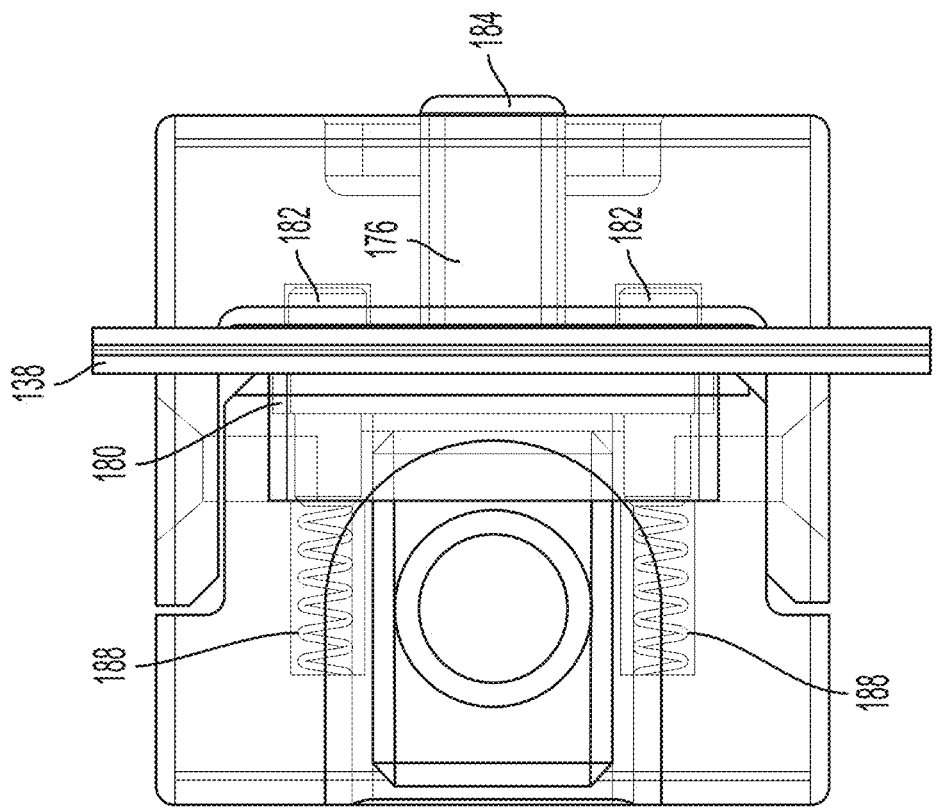
FIG. 18A
FIG. 18B

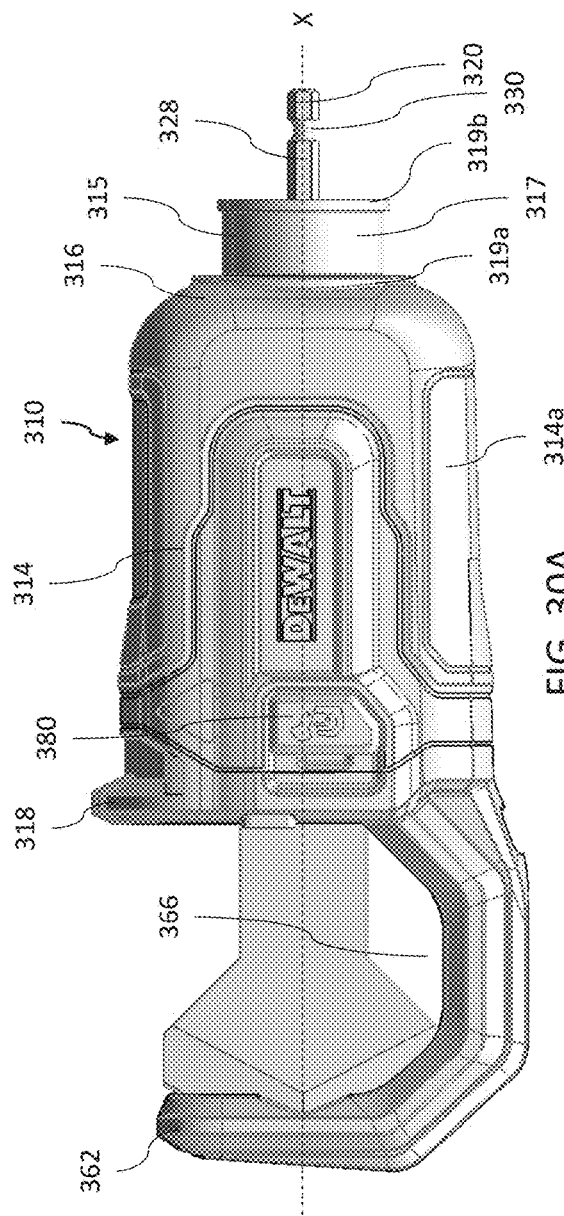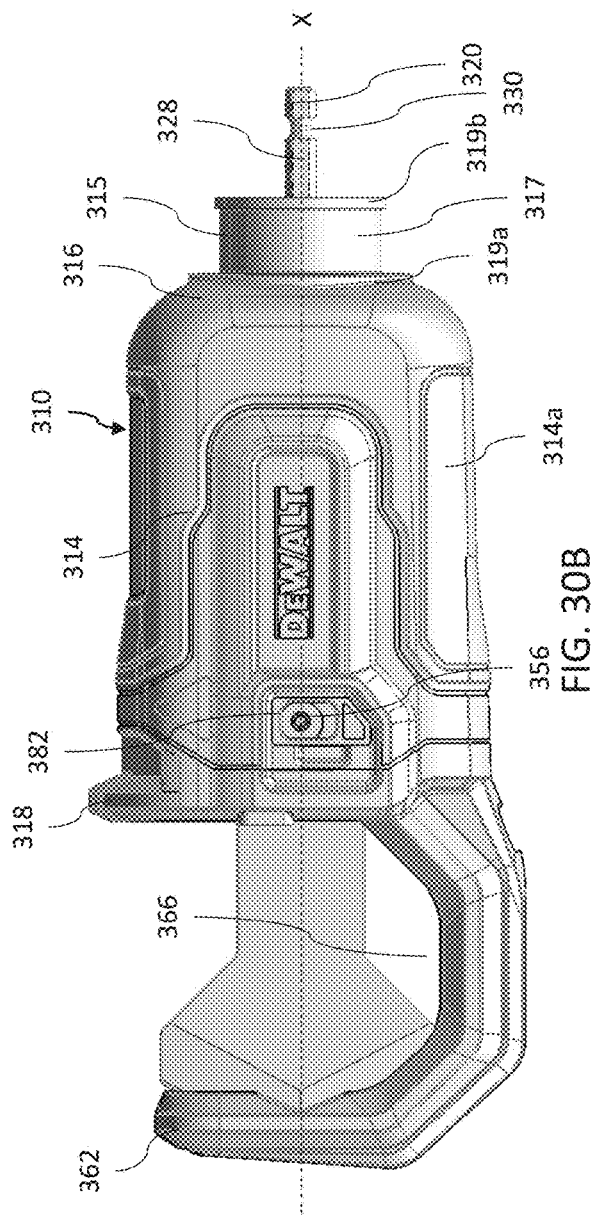

POWER TOOL ACCESSORIES FOR CUTTING ELONGATED MEMBERS

RELATED APPLICATIONS

This application claims priority, under 35 U.S.C. § 119(e) to U.S. Provisional Application No. 63/112,478, filed Nov. 11, 2020, titled "Power Tool Accessories for Cutting Elongated Members," U.S. Provisional Application No. 63/176,601, filed Apr. 19, 2021, titled "Power Tool Accessories for Cutting Elongated Members," and U.S. Provisional Application No. 63/263,403, filed Nov. 2, 2021, titled "Power Tool Accessories for Cutting Elongated Members," each of which is incorporated by reference.

TECHNICAL FIELD

This application relates to accessories usable with rotary power tools, such as drills and impact drivers, for cutting elongated members, including rods and tubular members such as PVC pipes.

BACKGROUND

Hand operated tools and power operated tools can be used to cut elongated members such as rods and tubular members, such as pipes.

SUMMARY

In an aspect, a power tool accessory for cutting elongated members includes a housing having a rear end and a front end and an input shaft received in a rear end of the housing. The input shaft extending along an axis is configured to be coupled to a rotary power tool to be driven in rotation by the power tool. A threaded shaft is received in the housing and coupled to and rotationally driven by the input shaft. A blade holder, holding a cutting blade, is coupled to the threaded shaft. A workpiece holder having a concave recess is coupled to and extends forward of the front end of the housing and is configured to hold an elongated member. Upon rotation of the input shaft, the threaded shaft rotates, causing the blade holder to move axially forward along the threaded shaft, exposing at least a portion of the blade from the front end of the housing to cut an elongated member held in the workpiece holder. Alternatively, rotation of the threaded shaft could cause the workpiece holder to move axially rearward along the threaded shaft to be at least partially retracted into the housing, pushing the elongated member against the blade to cut the elongated member.

Implementations of this aspect may include one or more of the following features. The blade holder may be coupled to a front end of the threaded shaft in a manner that the threaded shaft can rotate relative to the blade holder. The blade holder may be axially movable along the threaded shaft. The workpiece holder may be axially fixed relative to the housing and may receive the blade holder therein. The workpiece holder may have a threaded nut received over the threaded shaft such rotation of the threaded shaft causes the blade holder to be moved axially relative to the housing upon rotation of the input shaft to expose the blade from or retract the blade into the front end of the housing. Ribs, wear strips, and/or guide slots on an interior wall of the housing or an exterior wall of the workpiece holder may facilitate movement of the elongated member relative to the housing along the threaded shaft. The blade holder may have a guide rib that is received in an axial guide slot in the tubular blade holder. The blade may be removable from the blade holder using, e.g., threaded fasteners or a quick release mechanism. The workpiece holder may have a U-shaped, V-shaped, C-shaped, or other shaped recess for holding the elongated member. A C-shaped recess may have a first portion having a first radius, a second portion having a second radius smaller than the first radius, and a third portion having a third radius smaller than the second radius. The first radius may be on a bottom portion of the C-shaped recess, the third radius may be on a front portion of the C-shaped recess, and the second recess may be between the first and third recesses.

The workpiece holder may be integral with the front end of the housing. The blade holder may include a threaded bore that is threaded onto the threaded shaft. The blade holder may be rotationally fixed and axially movable relative to the housing so that when the threaded shaft rotates, the blade holder moves axially along the threaded shaft to expose the blade from or retract the blade into the front end of the housing. A first spring may be received over the threaded shaft at a rear end of the housing. A second spring may be received over the threaded shaft at a front end of the housing. A portion of the threaded shaft without threads may allow disengagement of the threaded shaft from the blade carrier to prevent bottoming out the nut at the forward most and rear most travel. The first and second springs may allow the blade carrier to re-engage the shaft when the direction of rotation is changed. The input shaft may have a polygonal front end that is received in a polygonal recess in a rear end of the threaded shaft. The blade holder may include a quick release mechanism for quickly removing the blade from the blade holder. The quick release mechanism may include an actuator button that is accessible through a window or opening in a sidewall of the housing.

The quick release blade holder may include a block with slot therein for receiving a rear end of the blade. The blade holder may include a locking member having one or more projections receivable in one or more openings in the rear end of the blade. For example, the blade holder may include two locking pins received in two apertures in the rear end of the blade. The blade holder may include a lateral protrusion received in a U-shaped opening in the rear end of the blade. The locking member may be moveable laterally, transverse to the axis, to engage the recesses in the blade. The locking member may be coupled to the actuator button and may be biased toward a locked position. Depressing the button may move the locking member to an unlocked position to enable removal or insertion of a blade into the blade holder. The housing may be coupled to a tool housing of the rotary power tool using a brace, for example one of the braces disclosed in U.S. Pat. No. 9,701,032, U.S. Provisional Application No. 63/175,938, filed Apr. 16, 2021, U.S. Provisional Application No. 63/217,874, filed Jul. 2, 2021, and U.S. Provisional Application No. 63/263,419, filed Nov. 2, 2021 each of which is incorporated by reference.

Advantages may include one or more of the following. The power tool accessory may facilitate quick and easy cutting of elongated members, including rods and tubular members such as PVC pipes, using an existing rotary power tool. These and other advantages and features will be apparent from the description and the drawings.

BRIEF DESCRIPTION OF THE DRAWINGS

FIG. 6 is a perspective view of the threaded shaft and blade pusher of FIG. 4.

FIG. 7 is an exploded perspective view of the threaded shaft and blade pusher of FIG. 6.

FIGS. 18A-18B are top views of the quick release blade holder of FIG. 16 partially in phantom.

FIG. 30A is a side view of the power tool accessory of FIG. 26.

FIG. 30B is a side view of the power tool accessory of FIG. 30A with the access port cover removed.

FIG. 31 is a cross-sectional view of the access port cover of the power tool accessory of

FIG. 26.

DETAILED DESCRIPTION

Figure 1A:
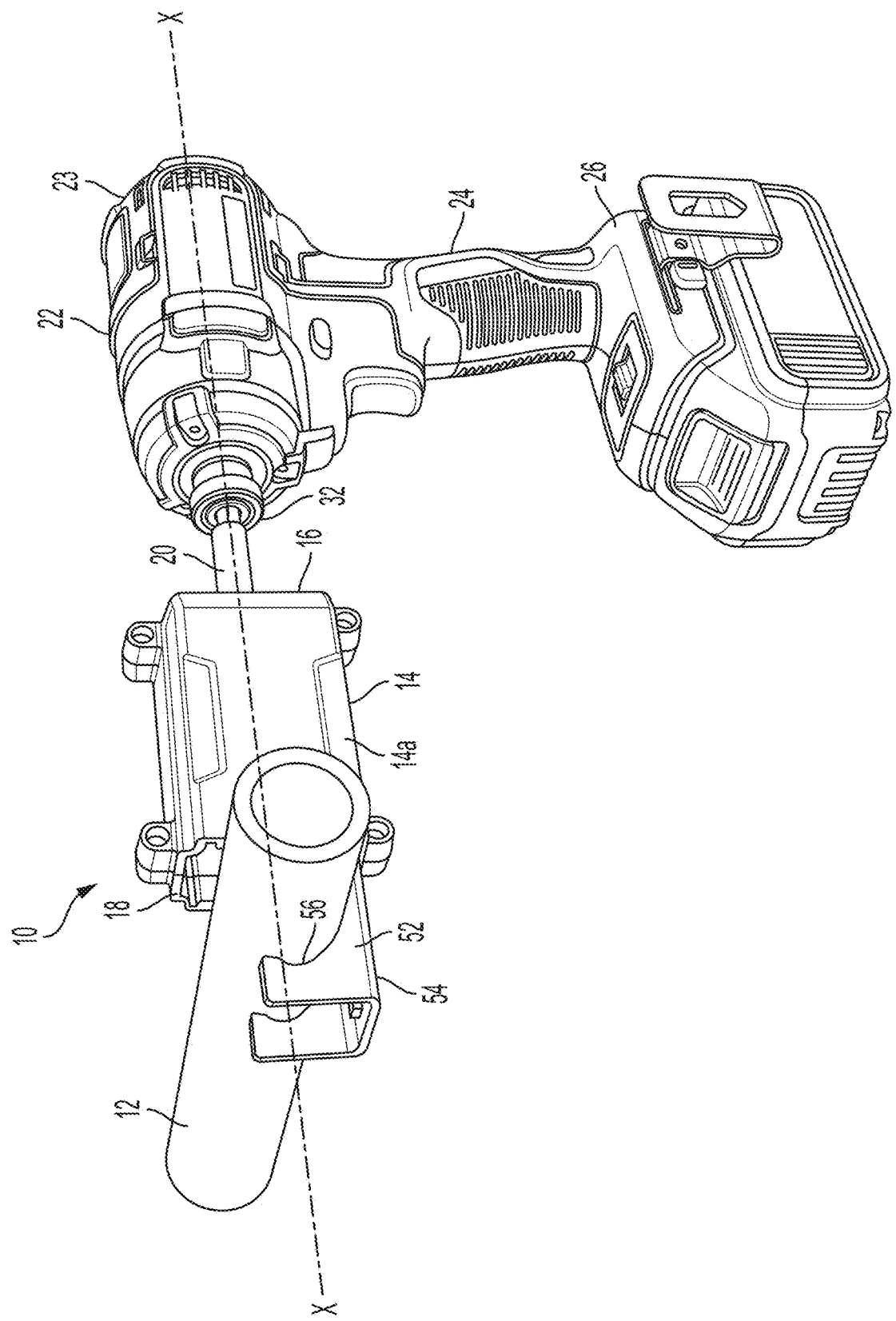
FIGS. 1A and 1B are perspective views of an implementation of a power tool accessory and power tool for cutting elongated members.
Figure 1B:
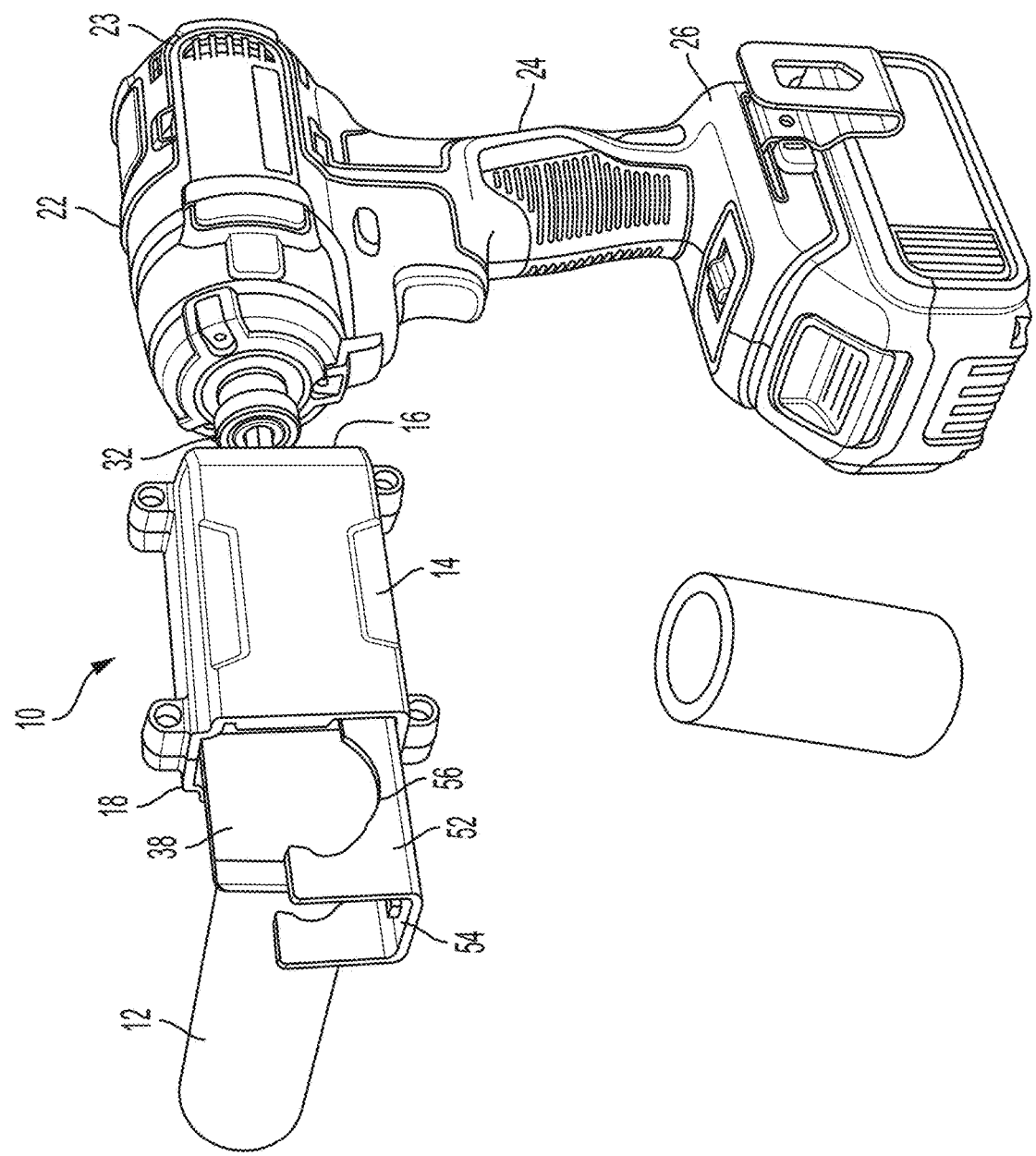
Figure 2:
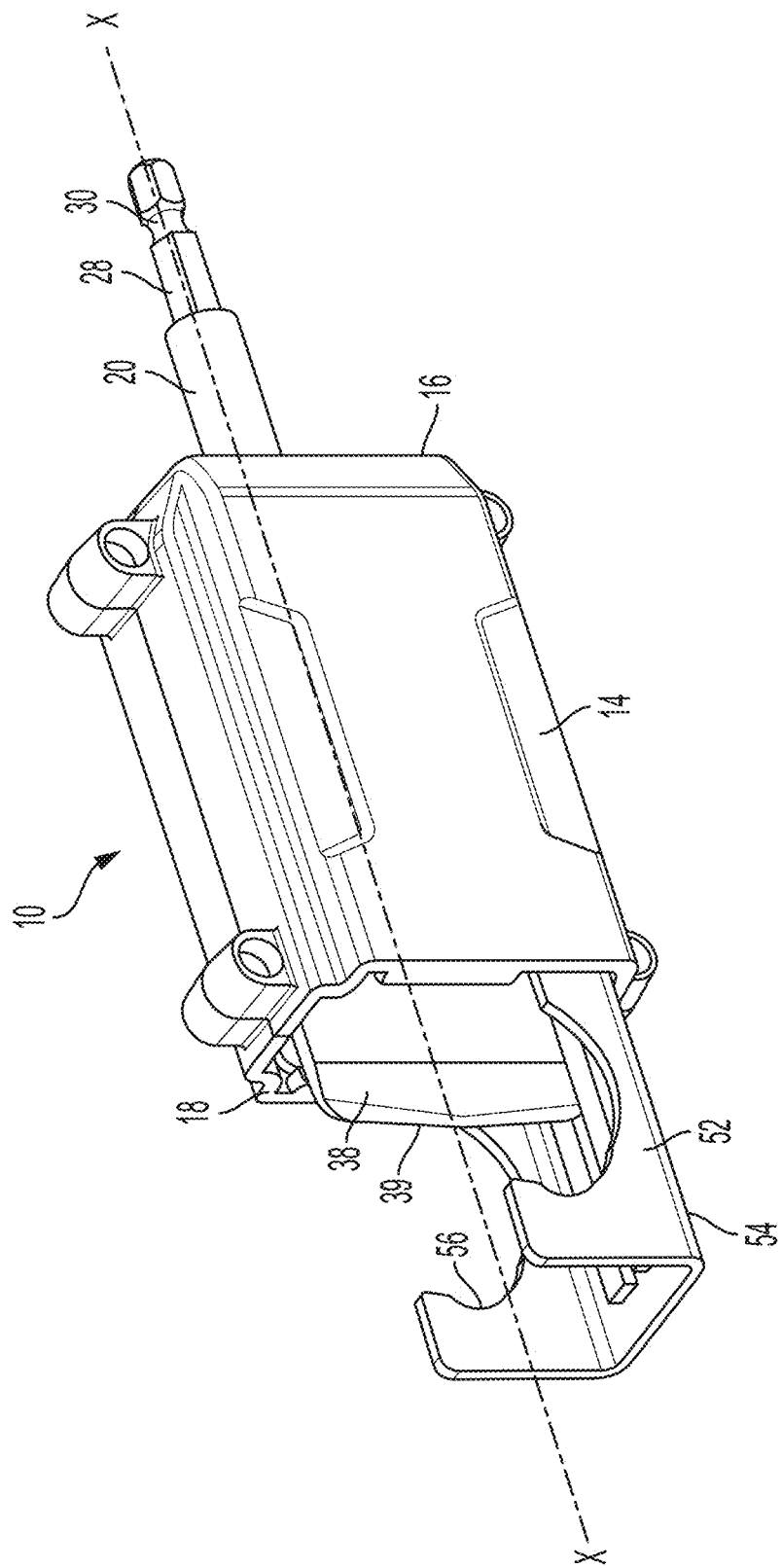
FIG. 2 is a perspective view of the accessory of FIGS. 1A-1B.
Figure 3:
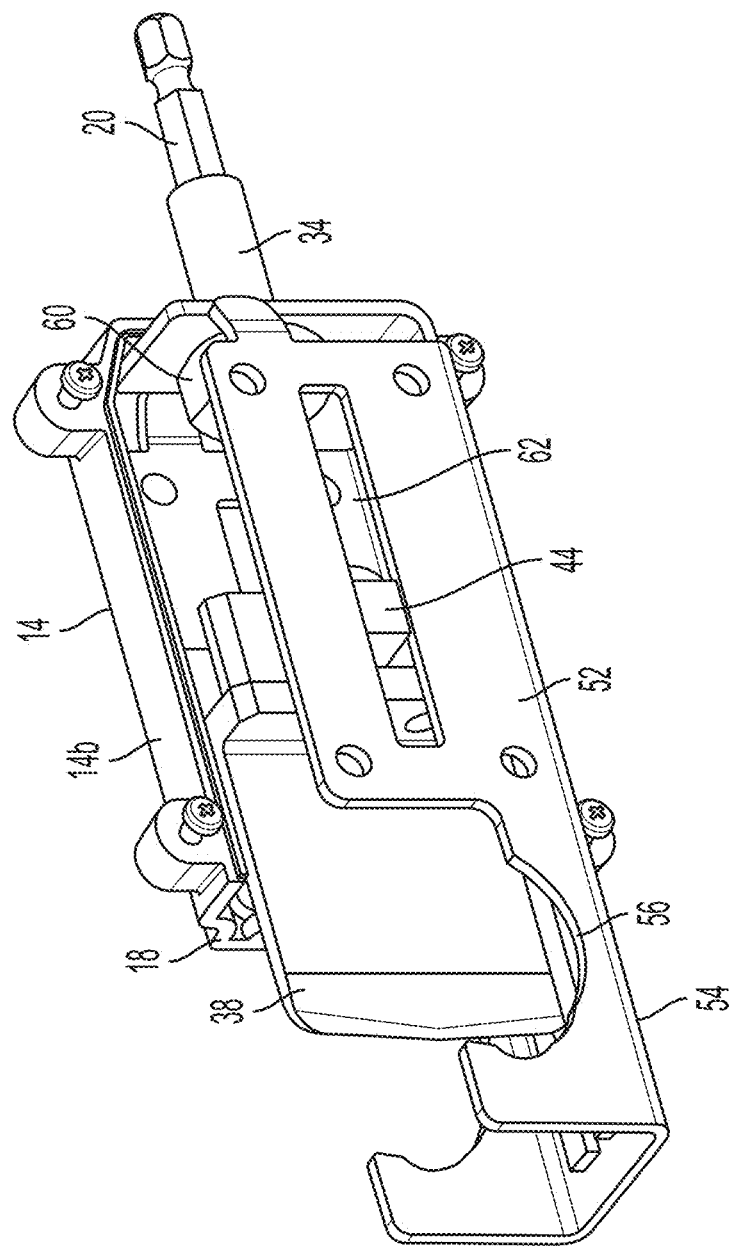
FIG. 3 is a perspective view of the accessory of FIGS. 1A-1B with a portion of the housing removed.
Figure 4:
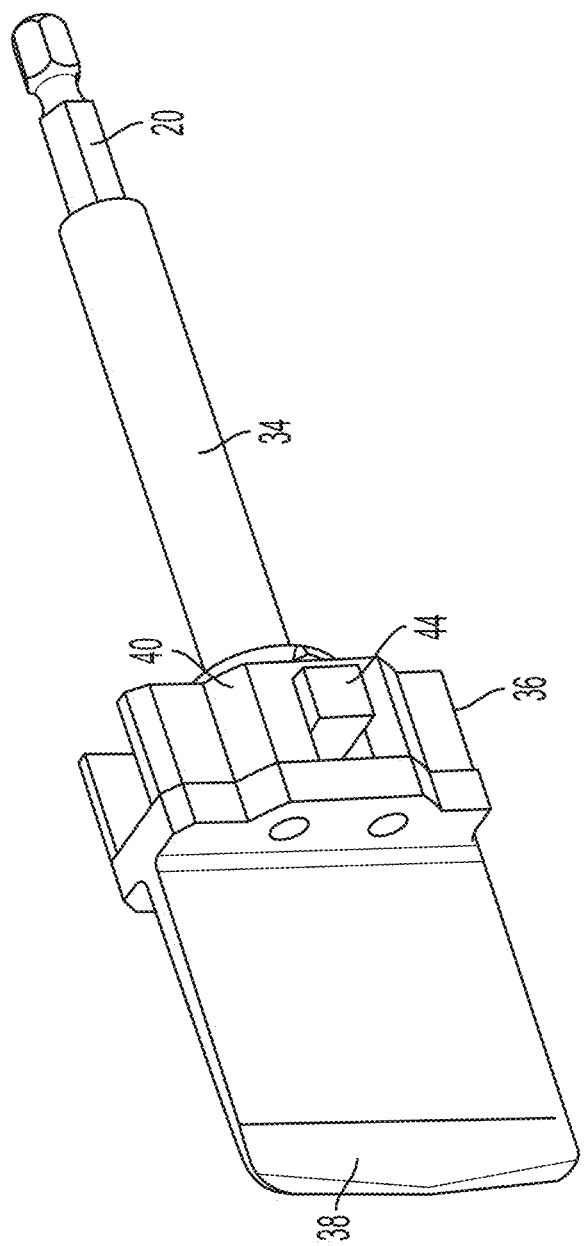
FIG. 4 is a perspective view of the threaded shaft, blade pusher, and blade of the accessory of FIGS. 1A-1B.
Figure 5:
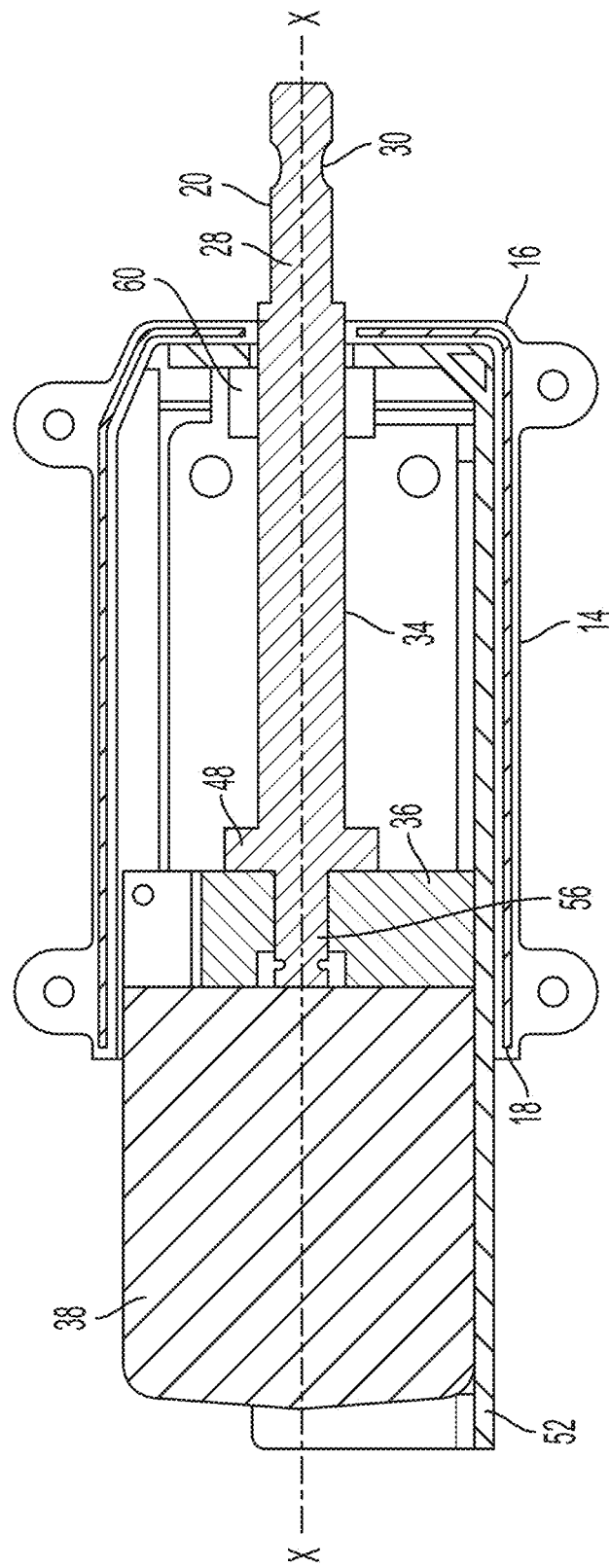
FIG. 5 is a cross-sectional view of the accessory of FIGS. 1A-1B.

Referring to FIGS. 1A-2, a power tool accessory 10 for cutting elongated members 12 includes a housing 14 having a rear end 16 and a front end 18, and an input shaft 20 received in the rear end 16 of the housing. The housing 14 may be formed of two clamshell halves 14a, 14b that are fastened together using lateral threaded fasteners. The input shaft 20 extends along an axis X and is configured to be coupled to a rotary power tool 22, e.g., a corded or cordless drill or an impact driver, to be driven in rotation. The input shaft 20 may have a hex shaped portion 28 with an annular groove 30 to facilitate coupling to a quick release tool bit holder 32 on the power tool 22. Optionally, the accessory housing 14 may be braced to or coupled to a housing 23, a handle 24, and/or a base 26 of the power tool 22 by a brace such as the ones disclosed in U.S. Pat. No. 9,701,032, U.S. Provisional Application No. 63/175,938, filed Apr. 16, 2021, U.S. Provisional Application No. 63/217,874, filed Jul. 2, 2021, and U.S. Provisional Application No. 63/263,419, filed Nov. 2, 2021, each of which is incorporated by reference.

Referring also to FIGS. 3-7, a threaded shaft 34 is received at least partially in the housing 14 and coupled to and rotationally driven by the input shaft 20. In one embodiment, the threaded shaft 34 may be integral with the input shaft 20. A blade holder 36, holding a cutting blade 38, is coupled to a front end 40 of the threaded shaft 34. The blade 38 may have a straight front cutting edge 39. For example, the blade holder 36 comprises a block shaped member 42 with side ribs 44 and a circular central opening 46. Coupled to the front end of the threaded shaft 34 is an annular flange 48 and a pilot shaft 50 configured to be received in the circular opening 46 in the blade holder 36 with the flange 48 abutting a rear surface of the blade holder. This connection allows the threaded shaft 34 to rotate relative to the blade holder 36 without the blade holder moving axially relative to the threaded shaft 34.

Figure 9:
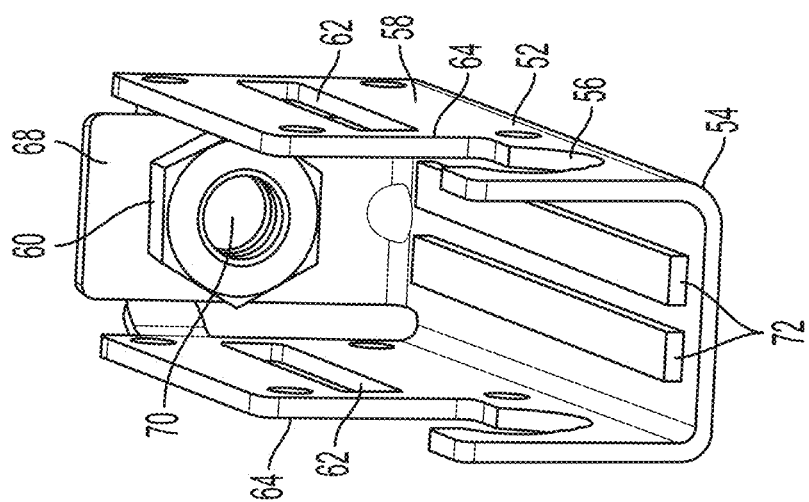
FIGS. 8 and 9 are perspective views of the workpiece holder of FIGS. 1A-1B.
Figure 8:
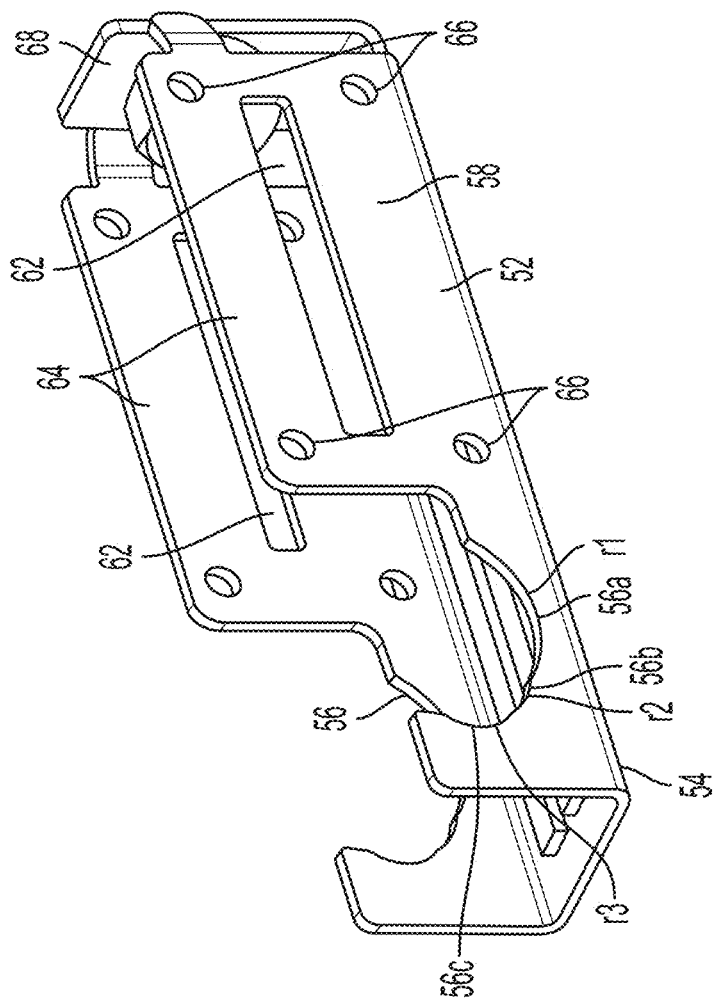

Referring also to FIGS. 8 and 9, coupled to and extending axially forward from the front end 18 of the housing 14 is a workpiece holder 52. The workpiece holder 52 may have a generally rectangular configuration (e.g., a piece of sheet metal bent into a member having a U-shaped cross-section). A rear end portion 58 of the workpiece holder 52 includes holes 66 configured to receive threaded fasteners for axially and rotationally fixing the workpiece holder 52 to the housing 14. A front end portion 54 of the holder 52 extends forward and outward from the front end 16 of the housing 14 and includes a concave recess 56 configured to hold the elongated member 12 for cutting by the blade 38. In an implementation, the recess 56 is generally C-shaped and may have a first portion 56a having a first radius r1 (e.g., 1.25"), a second portion 56b having a second radius r2 (e.g., 0.75") smaller than the first radius r1, and a third portion 56c having a third radius r3 (e.g., 0.5") smaller than the second radius r2. The first radius r2 may be on a bottom portion 56a of the C-shaped recess, the third radius r3 may be on a front portion 56c of the C-shaped recess, and the second radius r2 may be between the first and third recesses. In other implementations, the recess 56 may be U-shaped, V-shaped, or another shape with an open portion.

Coupled to a rear end wall 68 of the workpiece holder 52 is a threaded nut 60 with an internally threaded bore 70 that is threaded onto the threaded shaft 34. The workpiece holder 52 also has axially extending guide slots 62 defined in its sidewalls 64 that are configured to receive the lateral ribs 44 of the blade holder 42 to inhibit rotation of the blade holder 42 relative to the workpiece holder 52 and the housing 14 while allowing for axial movement of the blade holder 42.

The workpiece holder 52 may also include ribs or wear strips 72 that engage corresponding recesses in the blade holder 42.

In operation, the input shaft 20 is coupled to the tool holder of the rotary power tool 22 and the power tool is run in the reverse direction to retract the blade 38 as far as possible axially rearward into the housing 14 (see FIG. 1A). Then, the elongated member 12 to cut is inserted into the concave recess 54 in the workpiece holder 54. Next, the power tool is activated to run in the forward direction. Upon rotation of the input shaft 20, the threaded shaft 34 rotates relative to the nut, causing the workpiece holder 52 to move axially rearward toward the power tool 22. This movement pushes the pipe rearward against the blade, causing the blade to cut the pipe, as the blade 38 moves relatively axially forward to expose a greater portion of the blade 38 from the housing 14 and to engage and cut off a piece 12a of the elongated member 12 (see FIG. 1B). Once the cut is made, the blade can be retracted by running the power tool in reverse for another cutting operation.

Referring to FIGS. 10A-11B, in another implementation, a power tool accessory 110 for cutting elongated members includes a housing 114 having a rear end portion 116 and a front end portion 118, and an input shaft 120 received in the rear end portion 116 of the housing 114. The housing 114 may be formed of two clamshell halves 114a, 114b that are fastened together using lateral threaded fasteners. The input shaft 120 extends along an axis X and is configured to be coupled to a rotary power tool, e.g., a corded or cordless drill or an impact driver like power tool 22 described above, to be driven in rotation. The input shaft 120 may have a hex shaped portion 128 with an annular groove 130 to facilitate coupling to a quick release tool bit holder on the power tool. Optionally, the accessory housing 114 may include an extension portion 115. In some examples, the extension 115 may be substantially cylindrical. The extension 115 may include a coupling portion 117 between a first flange 119a and a second flange 119b. The extension portion 115 may allow the accessory housing 114 to be braced to or coupled to a housing, a handle, and/or a base of the power tool by a brace such as the ones disclosed in U.S. Pat. No. 9,701,032, U.S. Provisional Application No. 63/175,938, filed Apr. 16, 2021, U.S. Provisional Application No. 63/217,874, filed Jul. 2, 2021, and U.S. Provisional Application No. 63/263,419, filed Nov. 2, 2021, each of which is incorporated by reference. When coupling one of a braces disclosed in the aforementioned patent and patent applications, a collar on the brace may be coupled to the coupling portion 117 and received between the first and second flanges 119a, 119b. Further details of the brace may be found in the aforementioned patent and patent applications.

Figure 14:
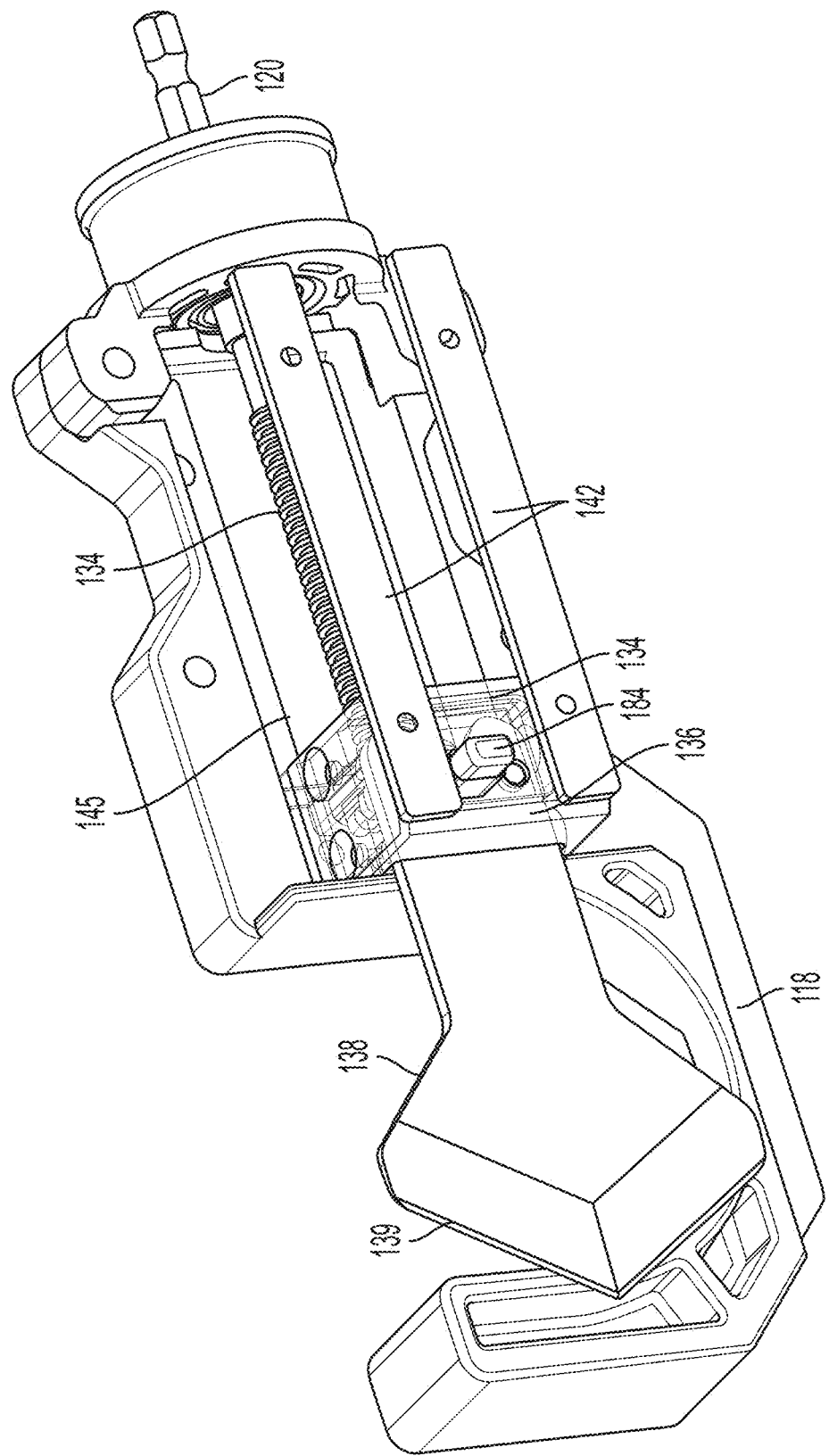
FIG. 14 is a perspective view of the accessory of FIGS. 10A-10B with a portion of the housing removed.
Figure 15:
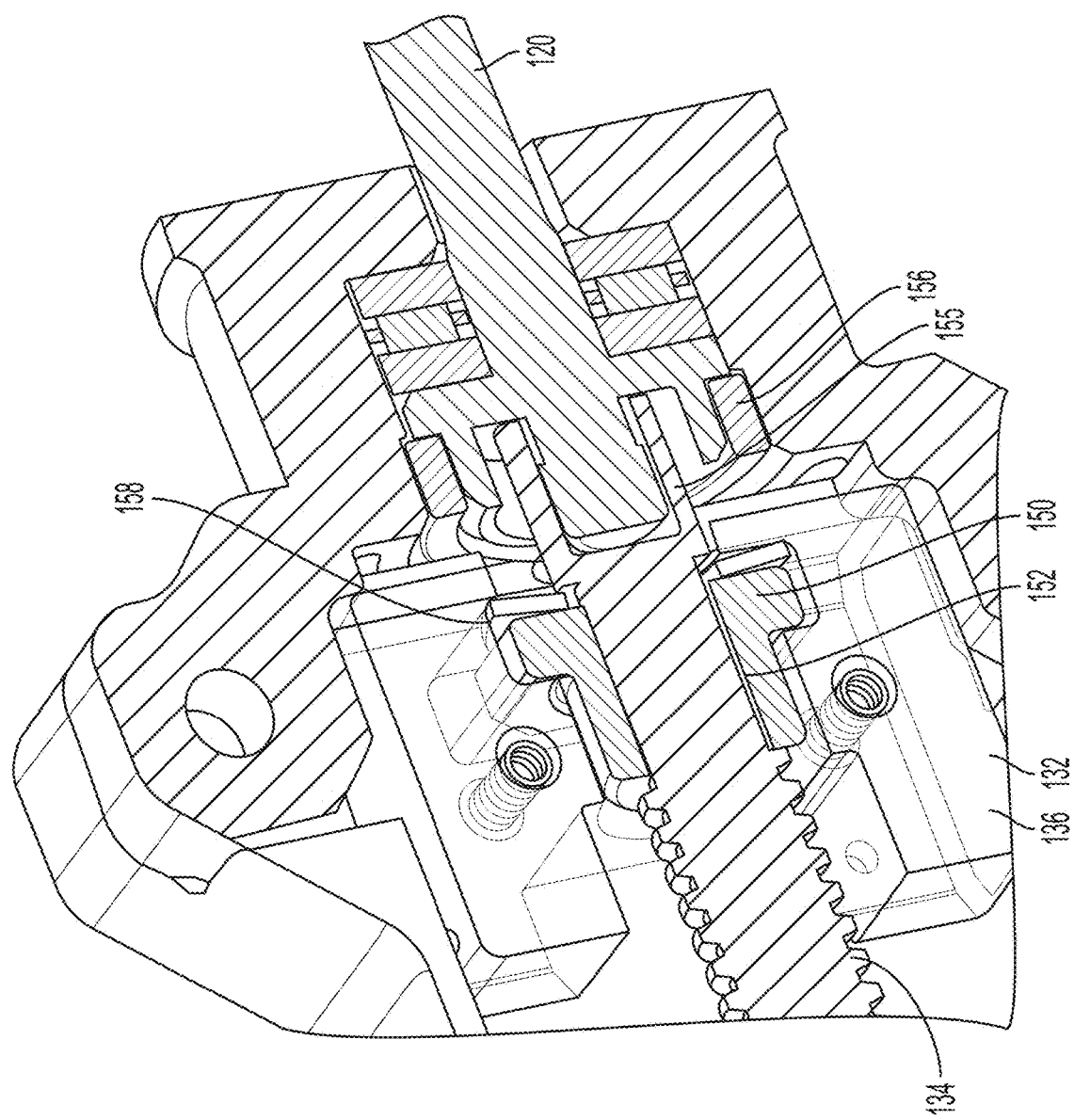
FIG. 15 is a close up cross-sectional view of the accessory of FIGS. 10A-10B.
Figure 16:
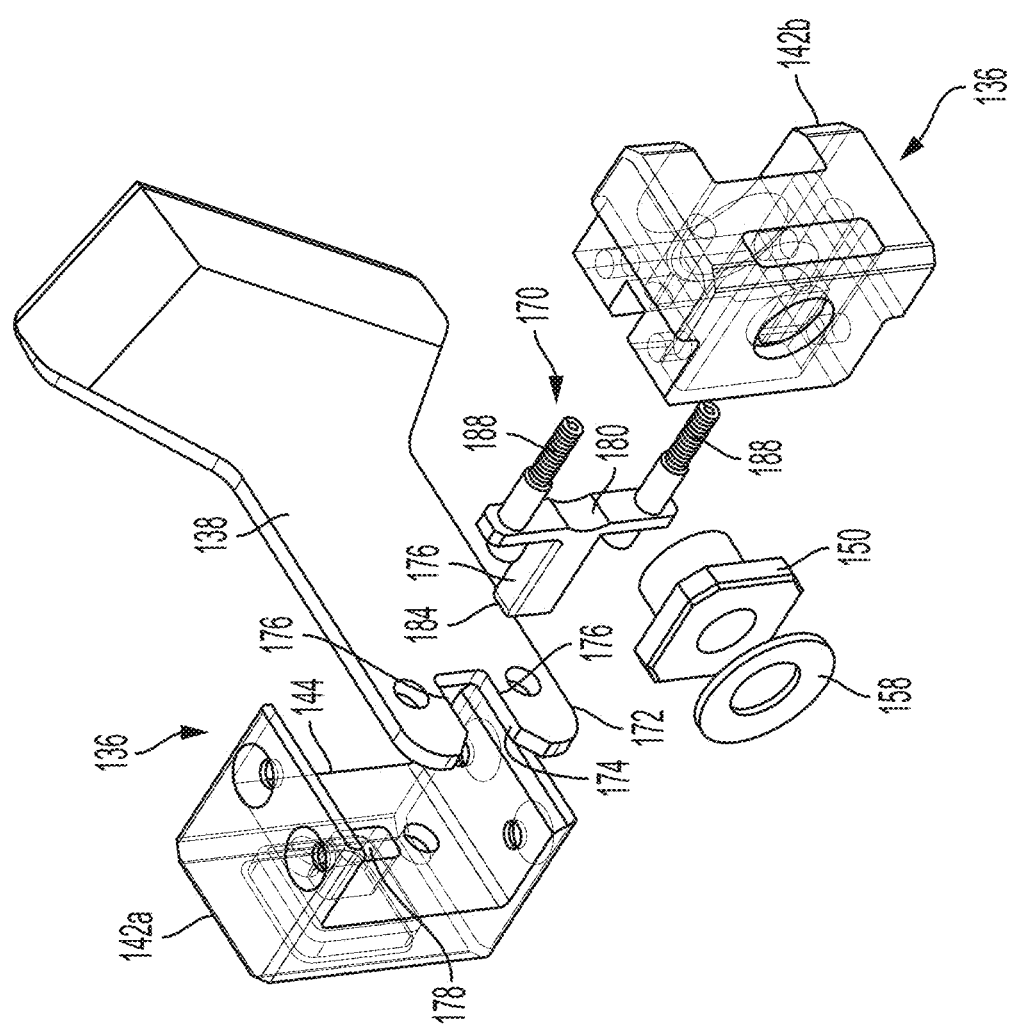
FIG. 16 is an exploded view of a quick release blade holder for use with the accessory of FIGS. 10A-10B.
Figure 17:
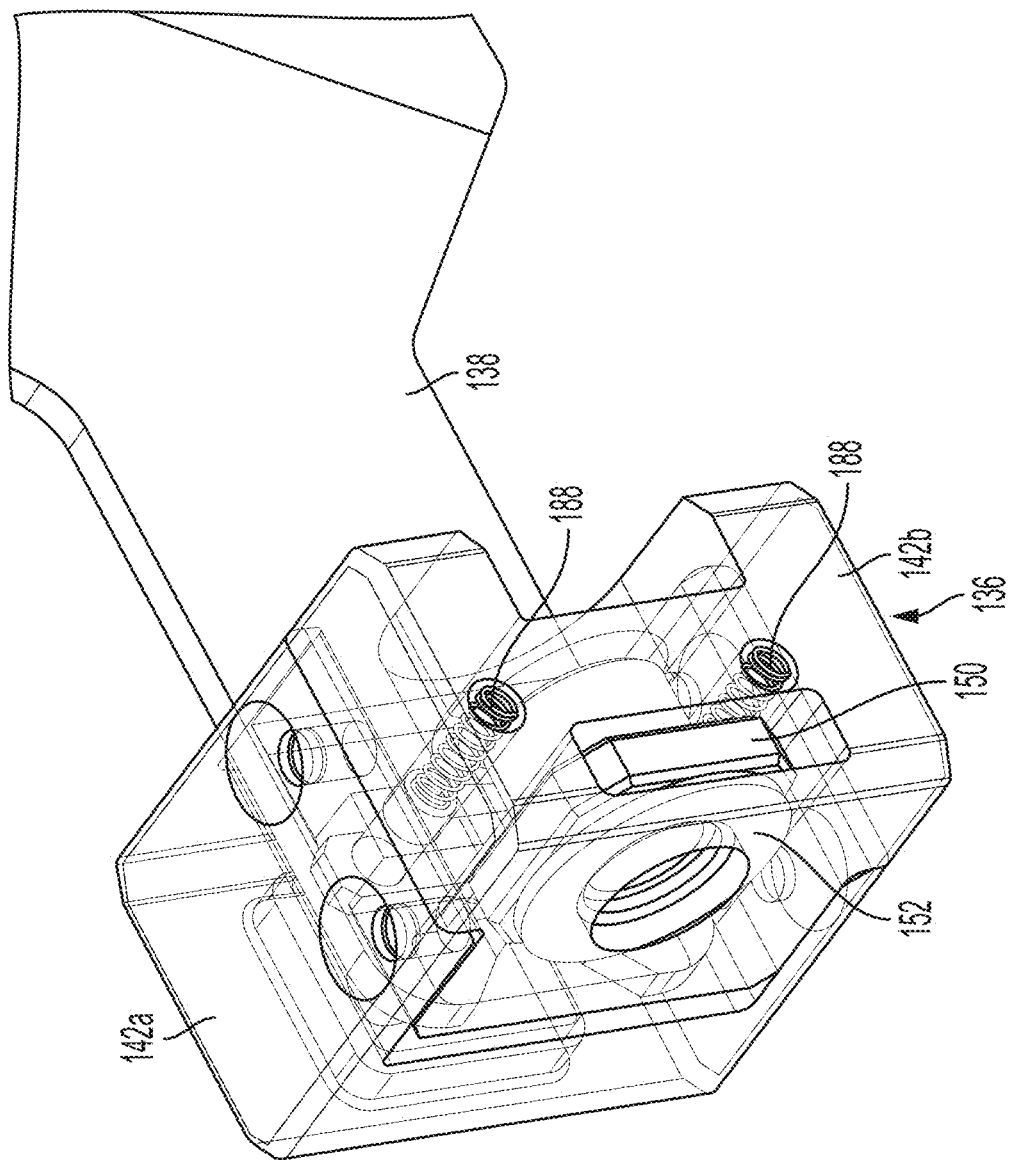
FIG. 17 is a perspective view of the quick release blade holder of FIG. 16 partially in phantom.

Referring also to FIGS. 12-15, a threaded shaft 134 is received at least partially in the housing 114 and is coupled to and rotationally driven by the input shaft 120. In the illustrated embodiment, the input shaft 120 has a polygonal (e.g., hex shaped) front end 122 that is received in a polygonal (e.g., hex shaped) recess 124 in the threaded shaft 134. Making them non-integral may help facilitate manufacturing and assembly. In other embodiments, the input shaft and threaded shaft may be integral. A blade holder 136, holding a cutting blade 138, is received over the threaded shaft 134 for axially movement along the threaded shaft 134. The blade 138 may have a triangular or wedge shaped front cutting edge 139. The blade holder 136 includes a block shaped member 142 that may be composed of two block shaped halves 142a, 142b fastened to one another with threaded fasteners 143 and defining a slot 144 therebetween for receiving a rear end portion of the blade 138. In other embodiments, the blade holder may be a single piece or may be composed of three or more components. The block shaped member 142 is received in an elongated rectangular recess 145 in the housing 114 to prevent rotation while allowing axial movement of the blade holder 136 relative to the housing 114. The block shaped member 142 and/or the interior wall of the housing 114 each may further include ribs, recesses, or wear strips to facilitate axial movement of the blade holder 136 relative to the housing. For example, as shown in FIG. 14, wear strips 147 are coupled to an interior of the rectangular recess 145 to engage the blade holder 134.

A nut 150 with a threaded hole 152 is non-rotatably received in the blade holder 132 adjacent the slot 144 that receives the blade and is threaded over the threaded shaft 134. In this manner, rotation of the threaded shaft 134 causes the nut 150 and blade holder 136 to move axially along the threaded shaft 134 in the rectangular recess 145 in the housing 114. The threaded shaft 134 is supported at its front end 153 by a front bearing 154 and at its rear ends 155 by a rear bearing 156. Disposed over the threaded shaft 134 in front of the rear bearing 156 is a first spring 158 (e.g., a first Belville washer (as illustrated), a first compression spring, a first wave spring, or another type of spring) and disposed over the threaded shaft 134 rearward of the front bearing 154 is a second spring 160 (e.g., a second Belville washer(as illustrated), a first compression spring, a first wave spring, or another type of spring). The springs 158, 160 are configured to abut the nut 150 at its rearward-most and forward-most positions, respectively, to prevent the nut from bottoming out or becoming disengaged from the threads on the threaded shaft 134.

Integral with the front end 118 of the housing 114 is a workpiece holder 162 having a concave recess 166 configured to hold an elongated member for cutting by the blade 138. In an implementation, the recess 166 is generally U-shaped and may have a first portion 166a that is straight and that sits rearward of the elongated member, a second portion 166b that is straight that sits forward of the elongated member and an intermediate concave portion 166c between the first and second portions 166a, 166b having radius r. Alternatively, the recess 166 may be generally C-shaped and may have portions with different radii as described above in the implementation of FIGS. 1A-9. In other implementations, the recess 166 may be V-shaped or have another open concave shape.

Figure 10A:
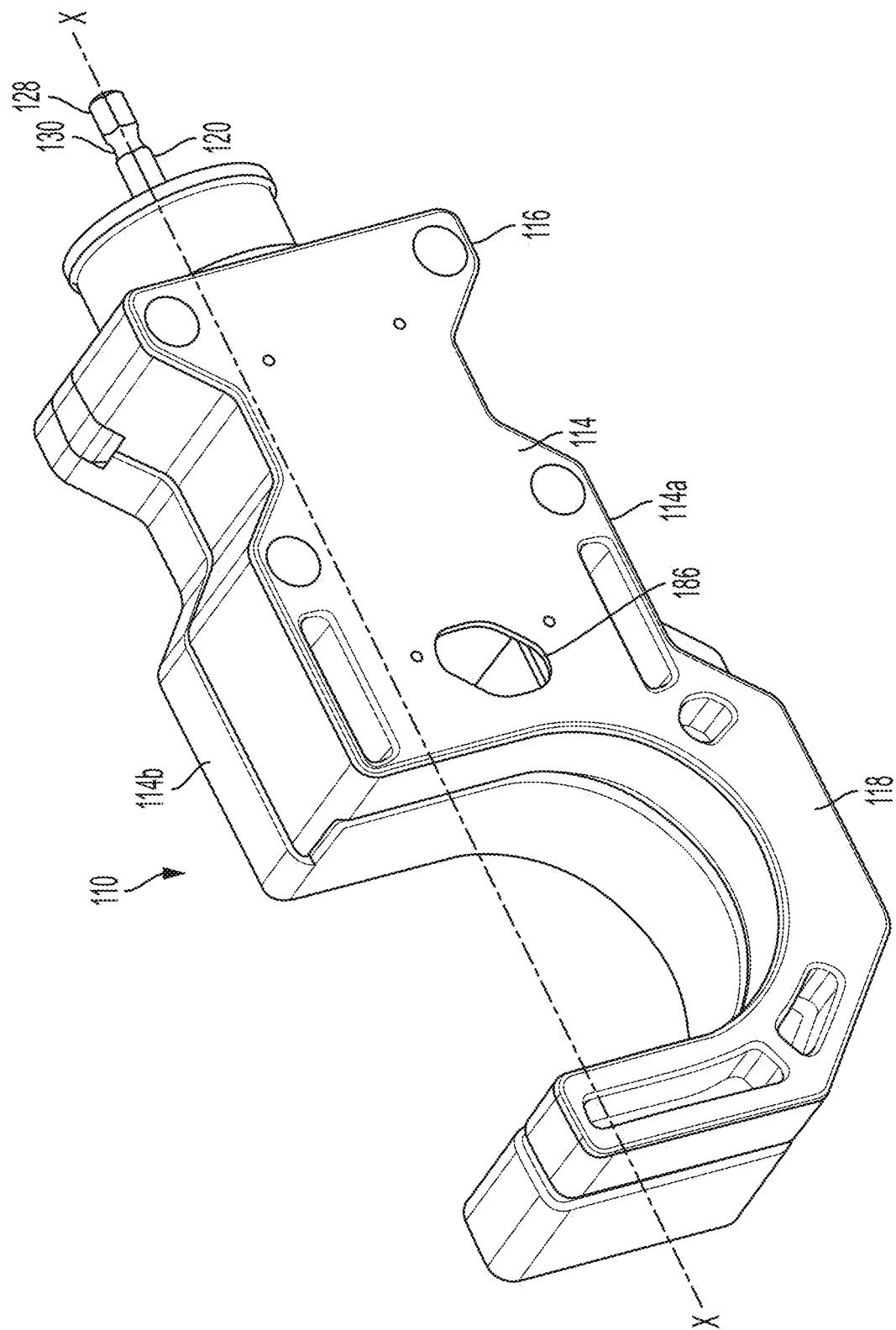
FIGS. 10A-10B are perspective views of another implementation of a power tool accessory for cutting elongated members.
Figure 10B:
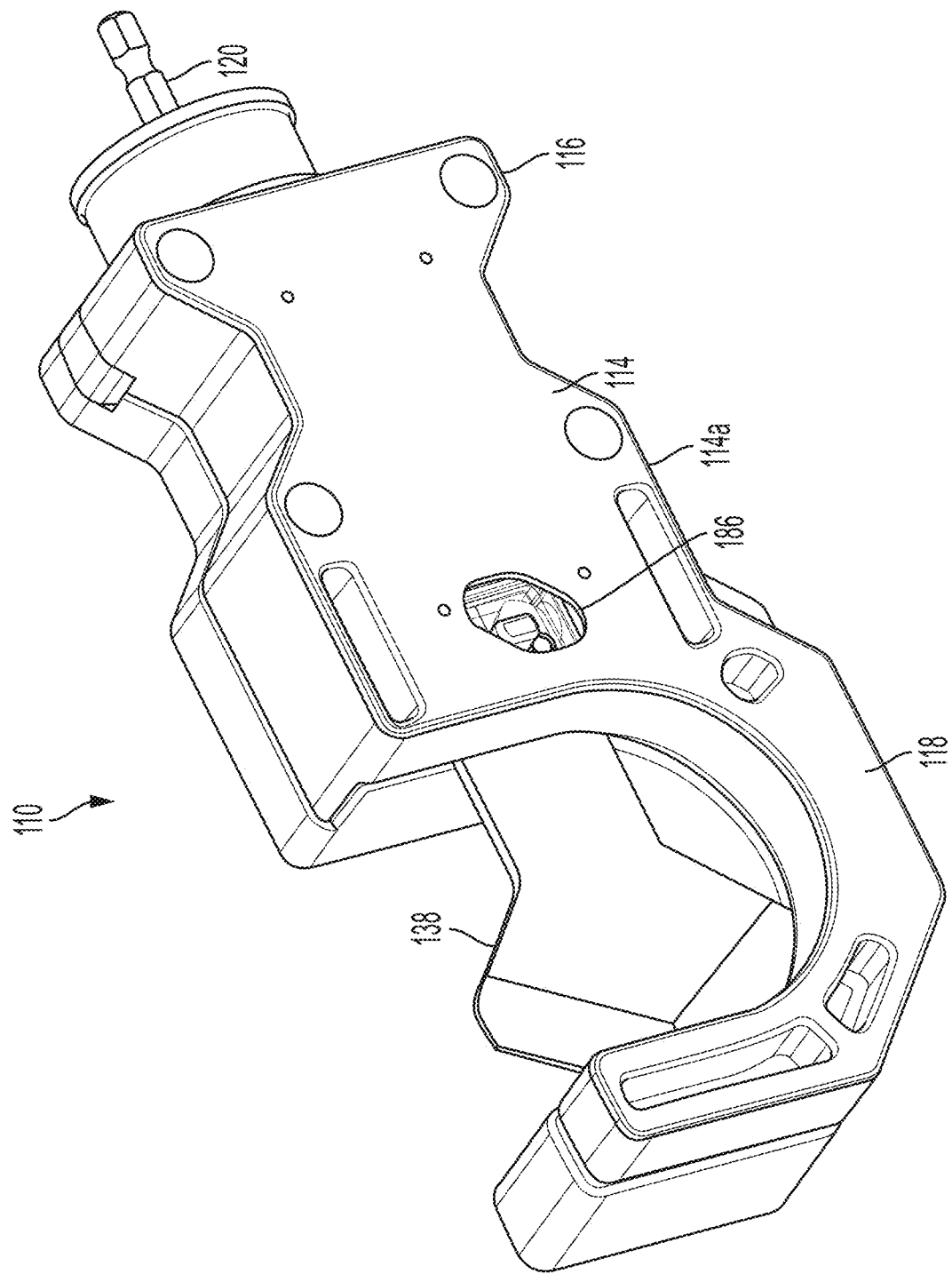
Figure 11A:
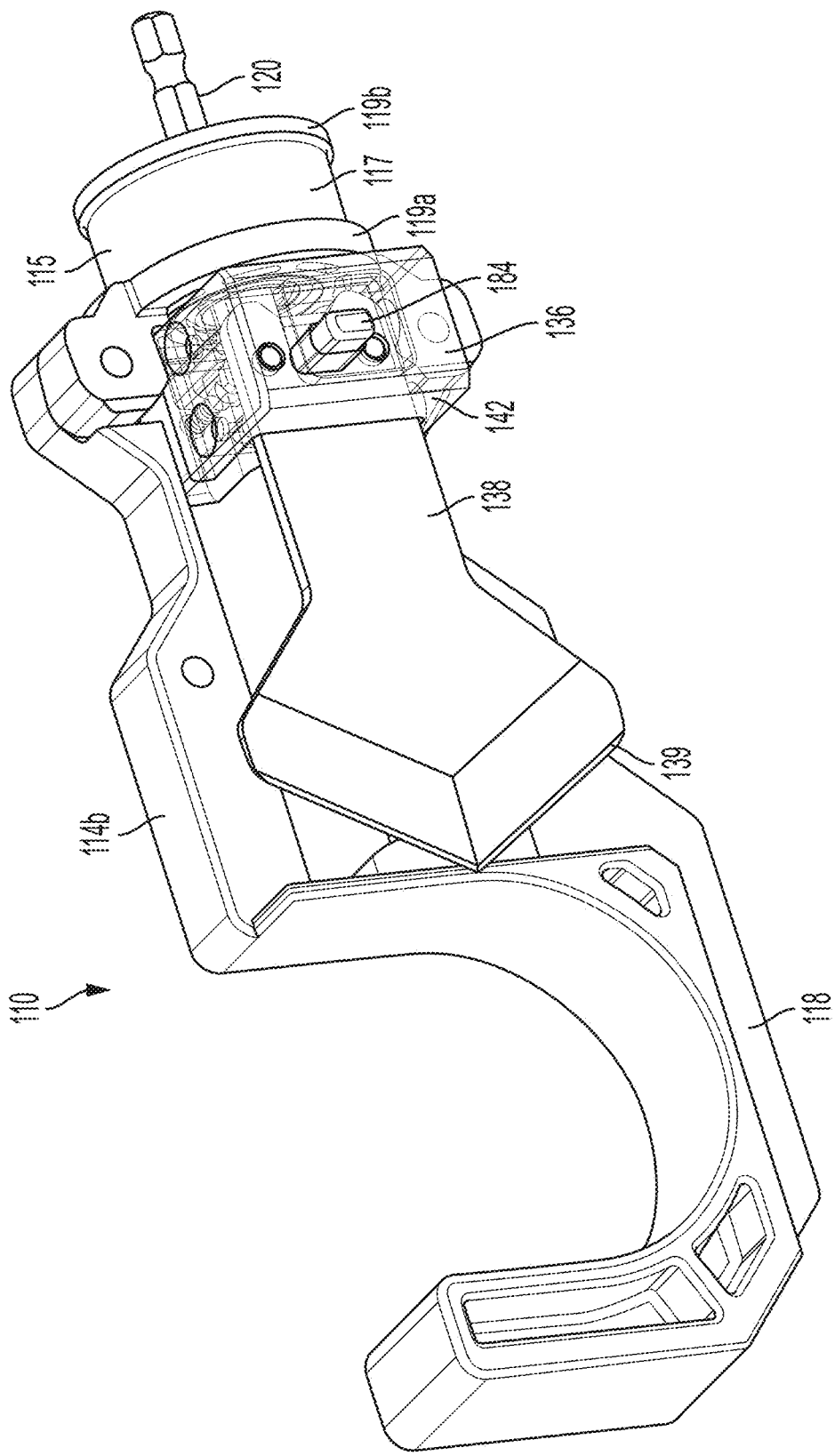
FIGS. 11A-11B are perspective views of the accessory of FIGS. 10A-10B with a portion of the housing removed.
Figure 11B:
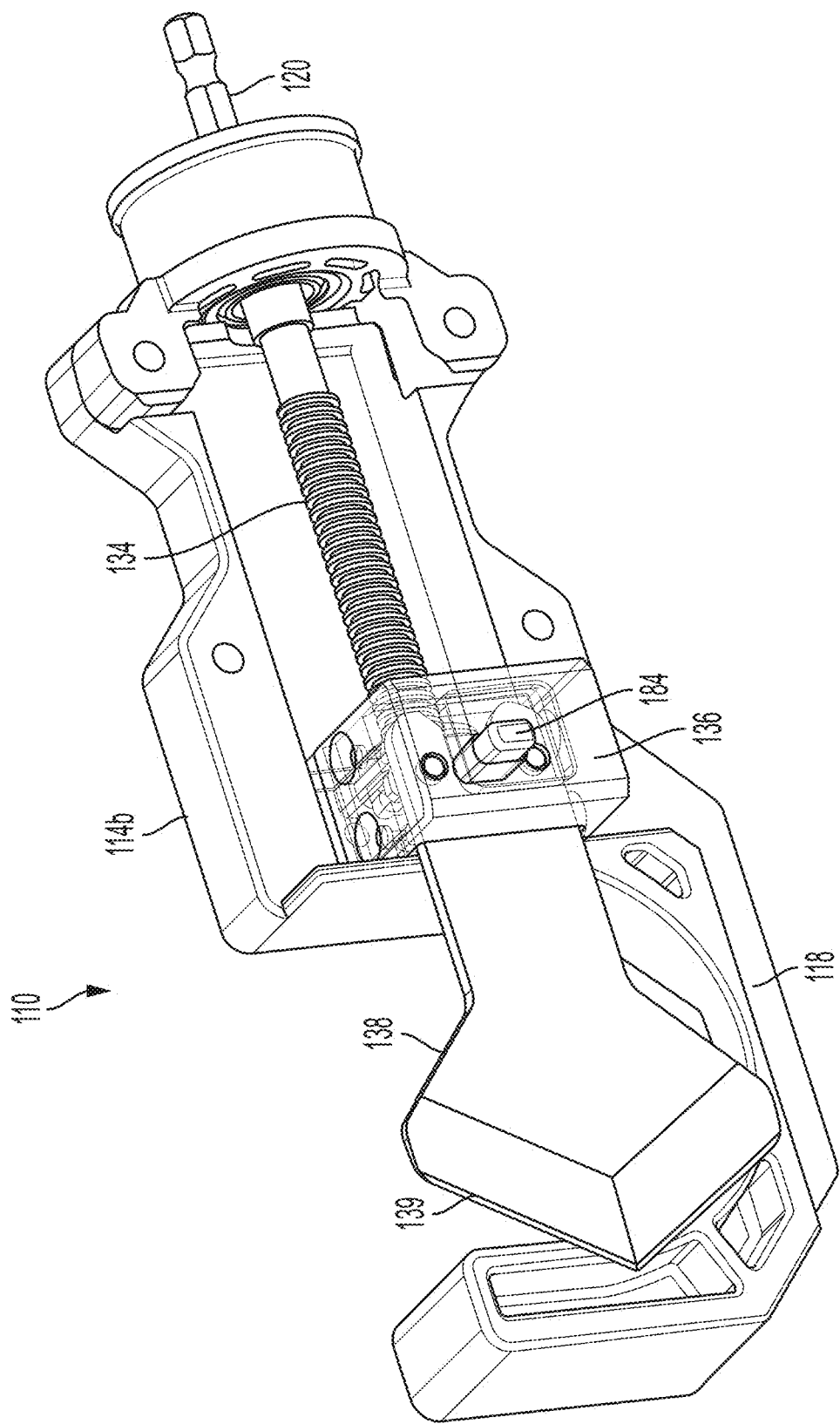
Figure 12:
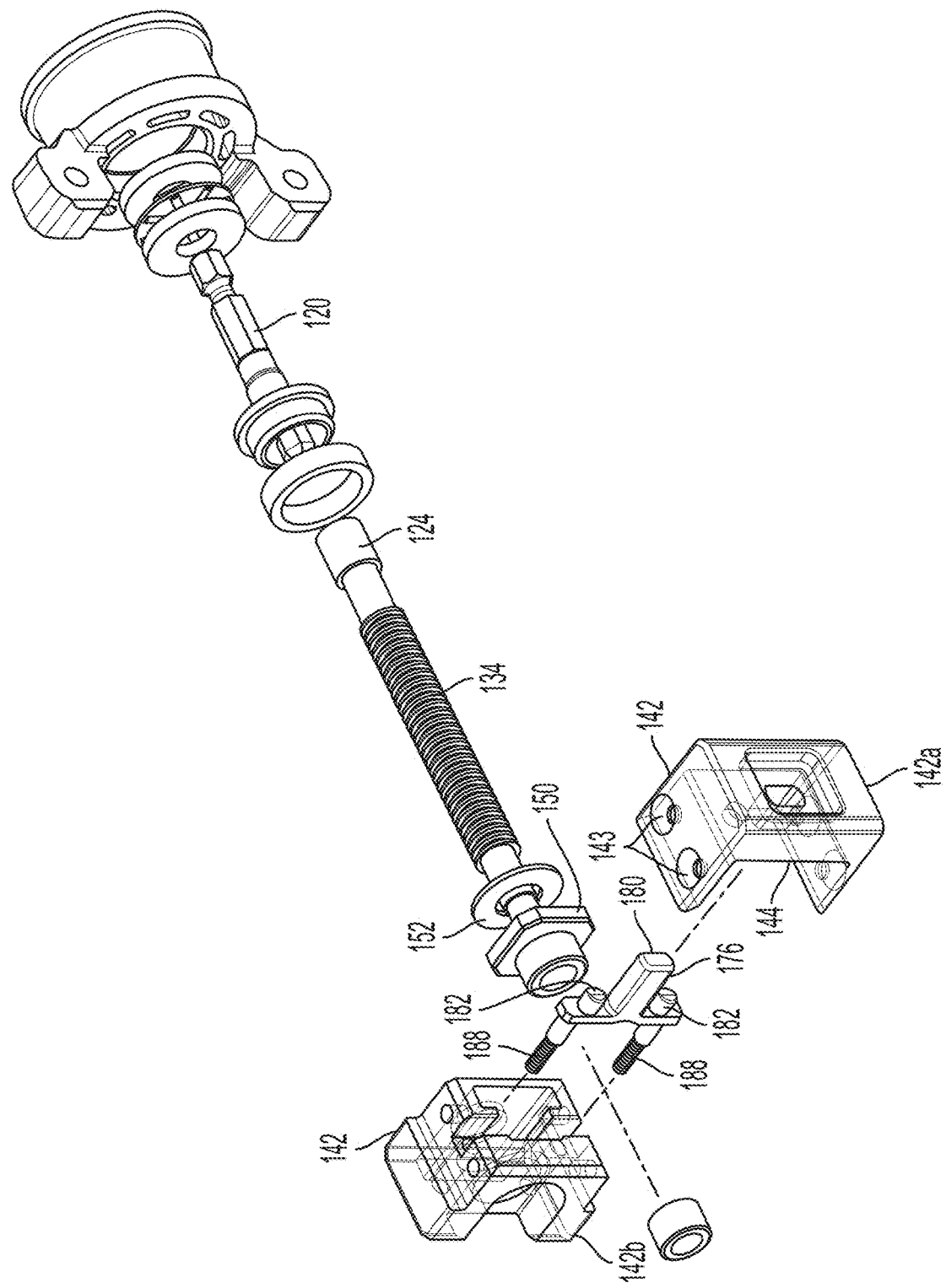
FIG. 12 is an exploded view of the accessory of FIGS. 10A-10B.
Figure 13:
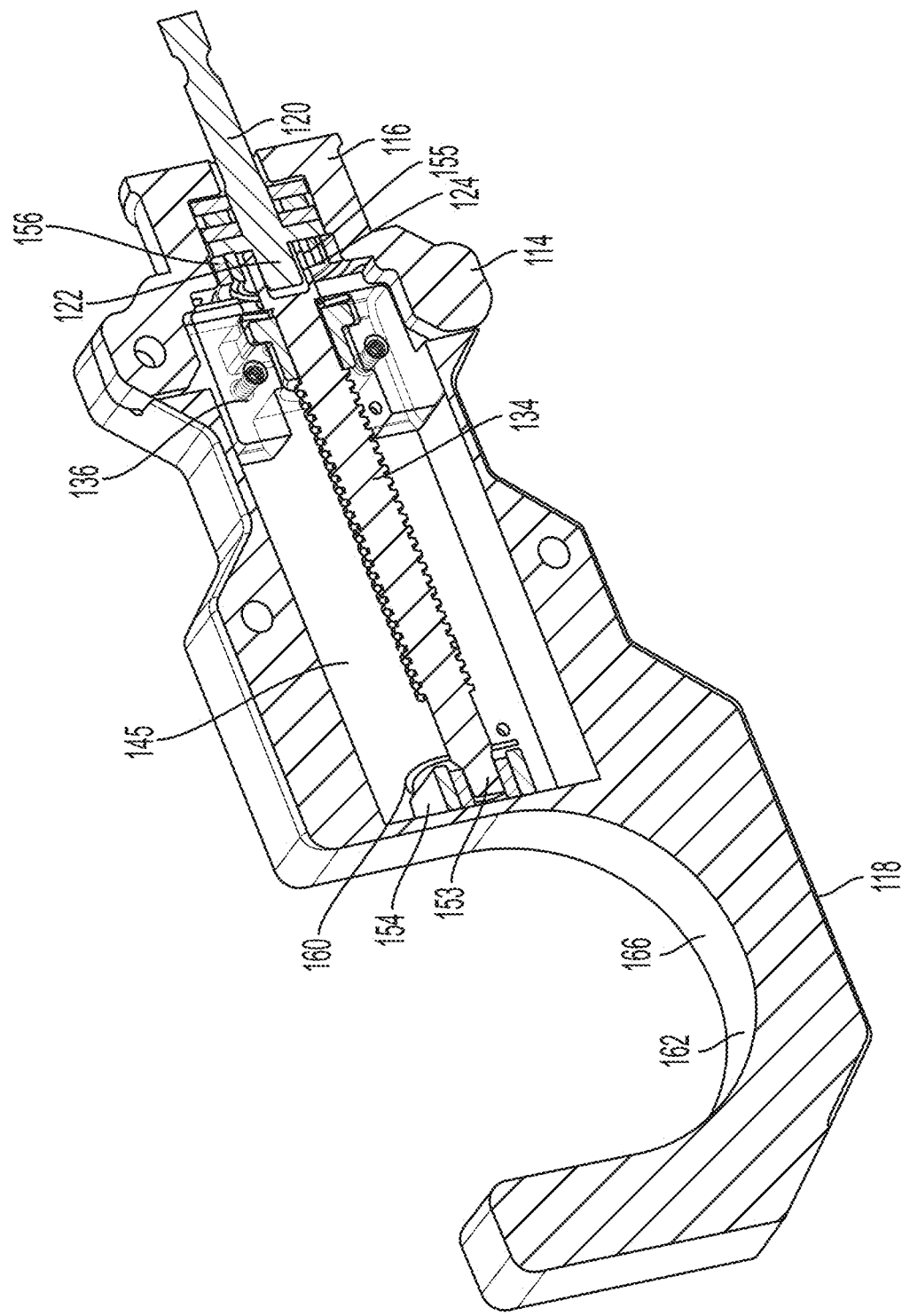
FIG. 13 is a cross-sectional view of the accessory of FIGS. 10A-10B.

In operation, the input shaft 120 is coupled to the tool holder of a rotary power tool and the power tool is run in the reverse direction to retract the blade 138 as far as possible axially rearward into the housing 114 (see FIGS. 10A and 11A). Then, the elongated member to be cut is inserted into the recess 166 in the workpiece holder 162. Next, the power tool is activated to run in the forward direction. Upon rotation of the input shaft 120, the threaded shaft 134 rotates relative to the nut 150, causing the nut 150, blade holder 136 and blade 138 to move axially forward toward the elongated member being held in the workpiece holder. This movement pushes the blade 138 forward against the elongated member, causing the blade to cut the pipe, as the blade 138 moves relatively axially forward to expose a greater portion of the blade 138 from the housing 114 (see FIGS. 10B and 11B). Once the cut is made, the blade can be retracted by running the power tool in reverse for another cutting operation.

Referring also to FIGS. 16-18B, in an implementation, the blade holder 136 may include a lock assembly in the form of a quick release mechanism 170 for quickly inserting a blade into and removing a blade from the blade holder without use of a secondary tool such as a screwdriver or wrench. As discussed above, the blade holder 136 includes a block shaped member 142, which may be composed of two block shaped halves 142a, 142b fastened to one another with threaded fasteners and defining a slot 144 therebetween for receiving a rear end portion 172 of the blade 138. In other implementations, the block shaped member may have a single component or more than two components. The rear end portion 172 of the blade may have a central U-shaped opening 174 and two or more (or fewer) round openings 176. The quick release mechanism 170 may include a rectangular shaft 176 that is received in a lateral opening 178 in the block 142a and that is receivable in the U-shaped opening 172 in the rear end of the blade 138. The rectangular shaft 176 is coupled to a cross-bar 180 that carries one or more pin-shaped projections 182 receivable in the round openings 176 in the rear end of the blade 138. For example, the cross-bar 180 may carry two locking pins 182 received in the two round openings 176 in the rear end of the blade 138. The rectangular shaft 176 extends through the blade holder to an actuator button portion 184 at its exposed end. The actuator button 184 is also accessible through a side window or opening 186 in the housing 114 (see FIG. 10A). On an opposite side of the cross-bar from the pin projections 182 are a pair of compression springs 188 received in pockets in the blade holder to bias the pin projections 182 toward engagement with the blade 138. As shown in FIG. 18A, at the rest position of the springs 188, the locking pins 182 engage the round openings in the blade to retain the blade in the blade holder. As shown in FIG. 18B, when the actuator button 184 is depressed in the direction of arrow A, the springs compress and the pins disengage from the blade to enable removal of the blade or insertion of a different blade into the blade holder.

Referring to FIGS. 19-25, in another implementation, a power tool accessory 210 for cutting elongated members includes a housing 214 having a rear end portion 216 and a front end portion 218, and an input shaft 220 received in the rear end portion 216 of the housing 214. The housing 214 may be formed of two clamshell halves 214a, 214b that are fastened together using lateral threaded fasteners. The input shaft 220 extends along an axis X and is configured to be coupled to a rotary power tool, e.g., a corded or cordless drill or an impact driver like power tool 22 described above, to be driven in rotation. The input shaft 220 may have a hex shaped portion 228 with an annular groove 230 to facilitate coupling to a quick release tool bit holder on the power tool. Integral with the front end 218 of the housing 214 is a workpiece holder 262 having a concave recess 266 configured to hold an elongated member to be cut. Optionally, the accessory housing 214 may include an extension portion 215. In some examples, the extension 215 may be substantially cylindrical. The extension 215 may include a coupling portion 217 between a first flange 219a and a second flange 219b. The extension portion 215 may allow the accessory housing 214 to be braced to or coupled to a housing, a handle, and/or a base of the power tool by a brace such as the ones disclosed in U.S. Pat. No. 9,701,032, U.S. Provisional Application No. 63/175,938, filed Apr. 16, 2021, U.S. Provisional Application No. 63/217,874, filed Jul. 2, 2021, and U.S. Provisional Application No. 63/263,419, filed Nov. 2, 2021, each of which is incorporated by reference. When coupling one of a braces disclosed in the aforementioned patent and patent applications, a collar on the brace may be coupled to the coupling portion 217 and received between the first and second flanges 219a, 219b. Further details of the brace may be found in the aforementioned patent and patent applications A threaded shaft 234 is received at least partially in the housing 214 along the axis X and is coupled to and rotationally driven by the input shaft 220. In the illustrated embodiment, the input shaft 220 has a polygonal recess 222 that receives a polygonal (e.g., hex shaped) rear end 224 of the threaded shaft 234. Making them non-integral may help facilitate manufacturing and assembly. In other embodiments, the input shaft and threaded shaft may be integral. The threaded shaft 234 has a rear unthreaded portion 270, a front unthreaded portion 272, and an intermediate threaded portion 274. A pair of unthreaded guide rods 276 are stationarily received in the housing 214 parallel to the threaded shaft 234 and offset from the axis X. The threaded shaft 234 is supported at its front end by a front bearing 254 and at its rear end by a rear bearing 256. A pair of rear compression springs 258 are received over rear ends of the guide rods 276 and a pair of front compression springs 260 are received over front ends of the guide rods 276.

Figure 22:
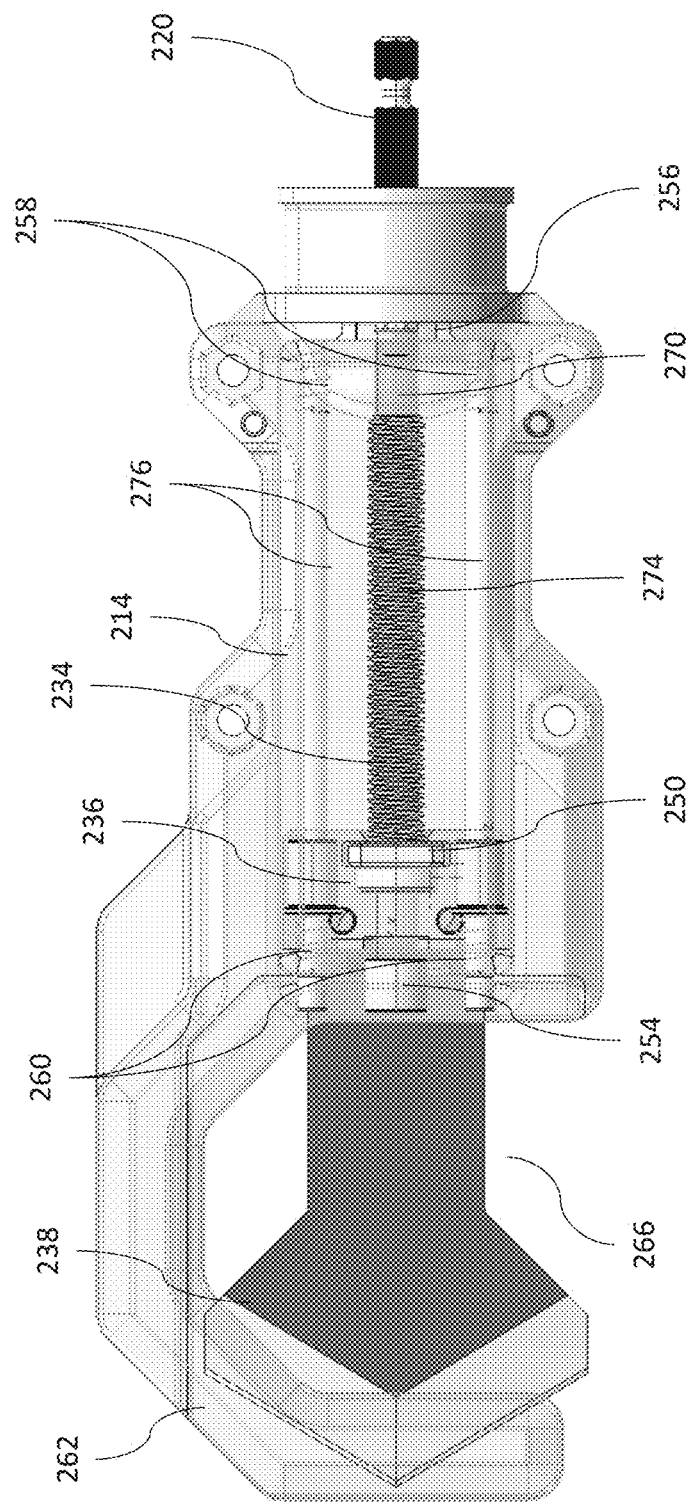
Figure 23:
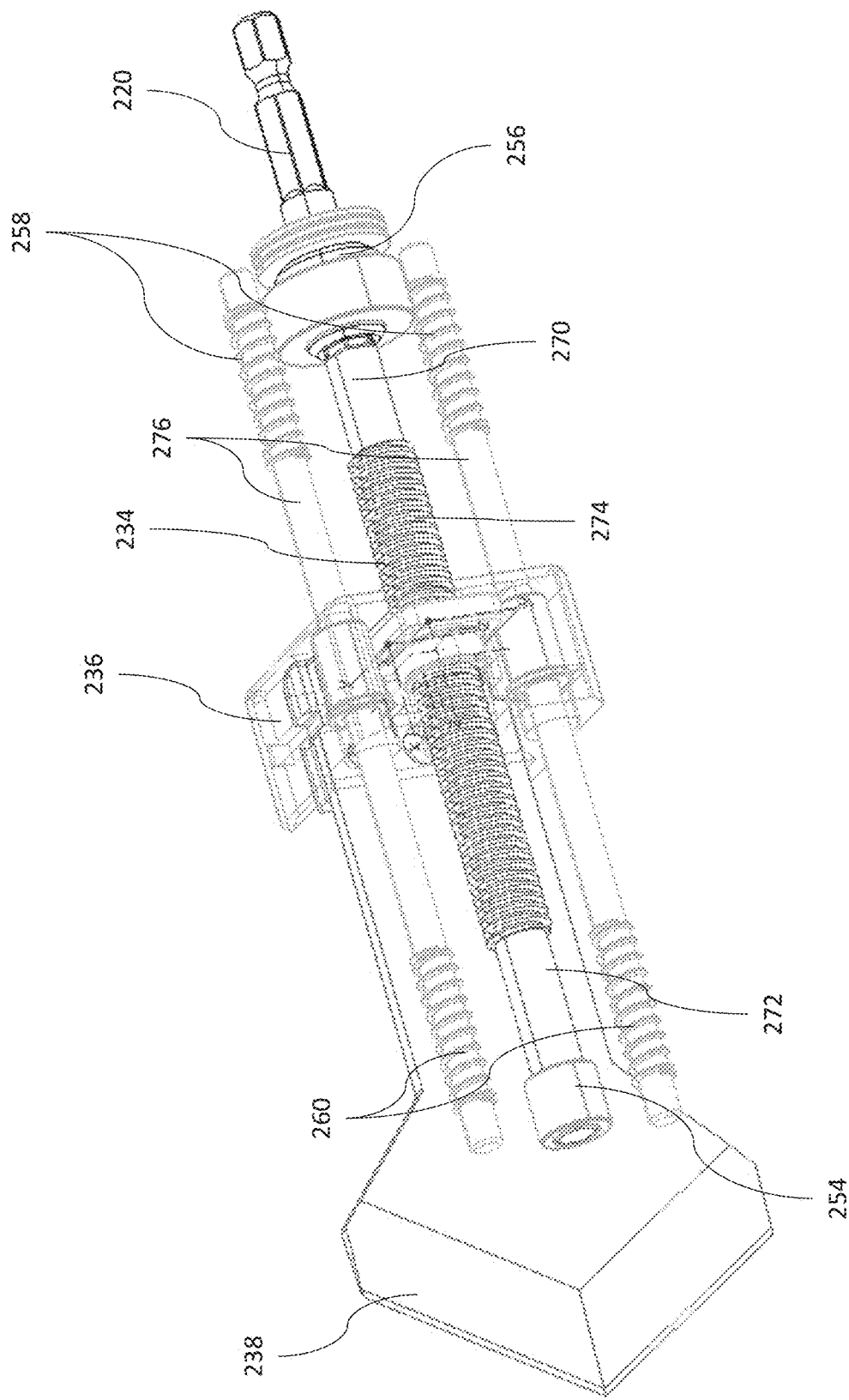
FIG. 23 is a perspective view of the power tool accessory of FIGS. 19-22 with the housing removed.
Figure 24:
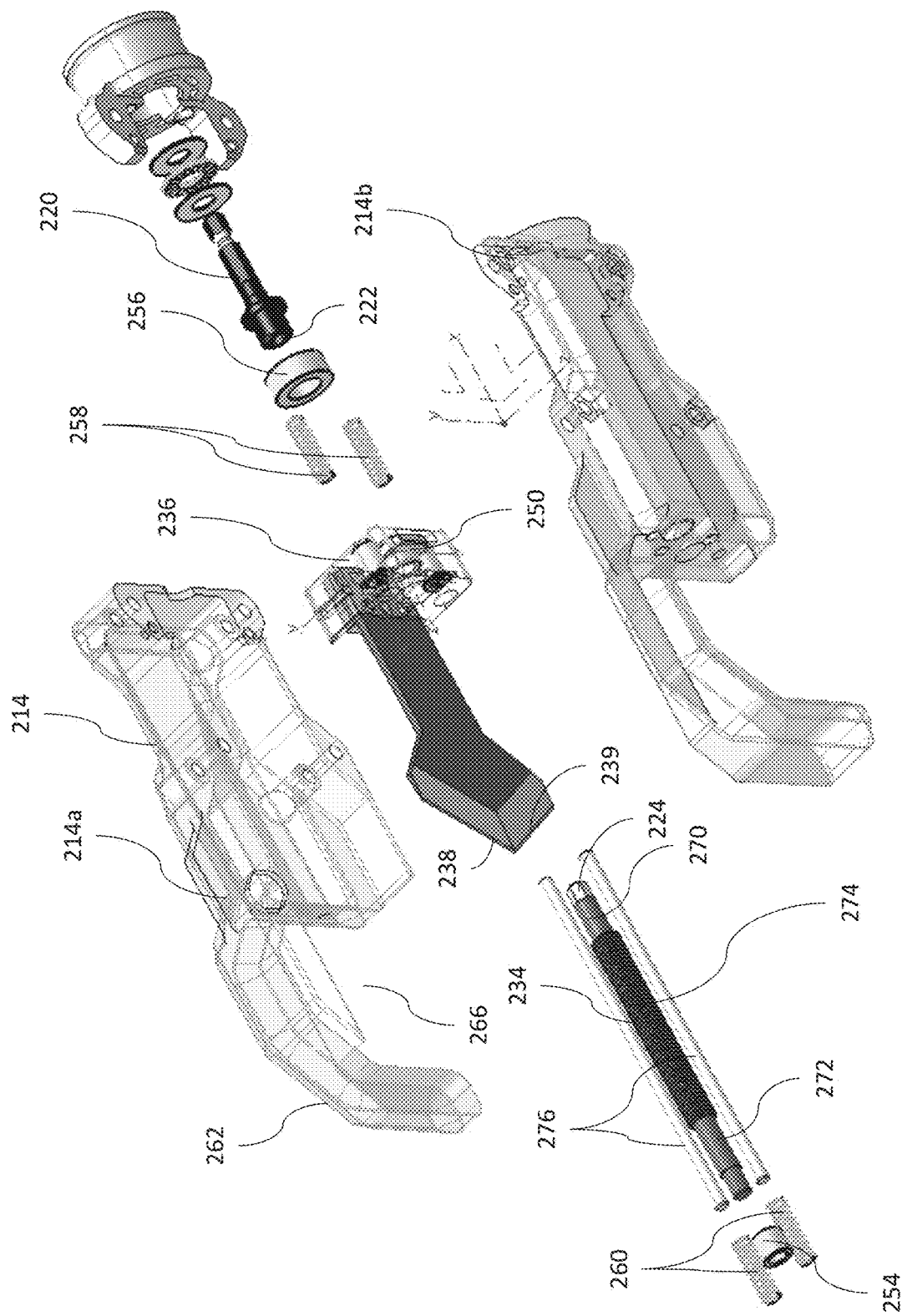
FIG. 24 is a perspective exploded view of the power tool accessory of FIGS. 19-22.
Figure 25:
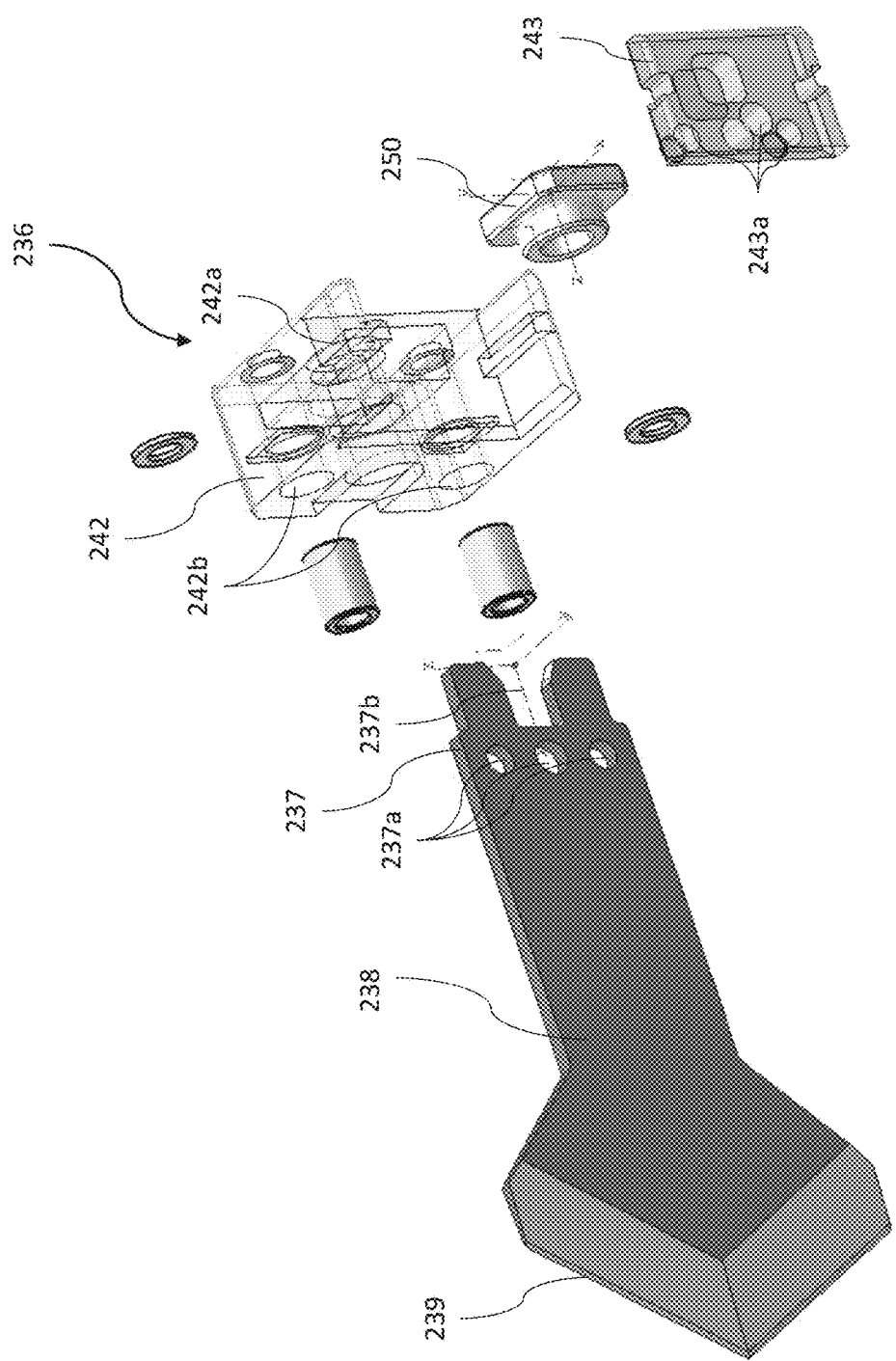
FIG. 25 is a perspective exploded view of some of blade holder and blade of the power tool accessory of FIGS. 19-22.

A blade holder 236, configured to removably hold a cutting blade 238, is received over the threaded shaft 234 for axial movement along the threaded shaft 234. The blade 238 may have a triangular or wedge shaped front cutting edge 239 and a tang 237 at its rear end with three lateral openings 237a and a U-shaped recess 237b. The blade holder 236 includes a block member 242 and a lock assembly in the form of a clamping plate 243 removably fastenable to the block member 242 another by threaded fasteners such as set screws (not shown) that are receivable through lateral openings 243a in the clamping blade 243 and lateral openings 237a in the blade tang 237. In other embodiments, the blade holder may be a single piece or may be composed of three or more components. The block member 242 includes a central bore 242a that non-rotatably receives a threaded nut 250 adjacent the blade. The block shaped member 242 and nut 250 are threadably received over the threaded shaft 234. The block shaped member 242 also includes unthreaded lateral bores 242b slidably received over the guide rods 276. Rotation of the threaded shaft 234 causes the nut 250 and blade holder 236 to move axially along the threaded shaft 234 and guide rods 276 within the housing 214 between a rearward-most position (FIG. 19) and a forward-most position (FIG. 22).

Figure 19:
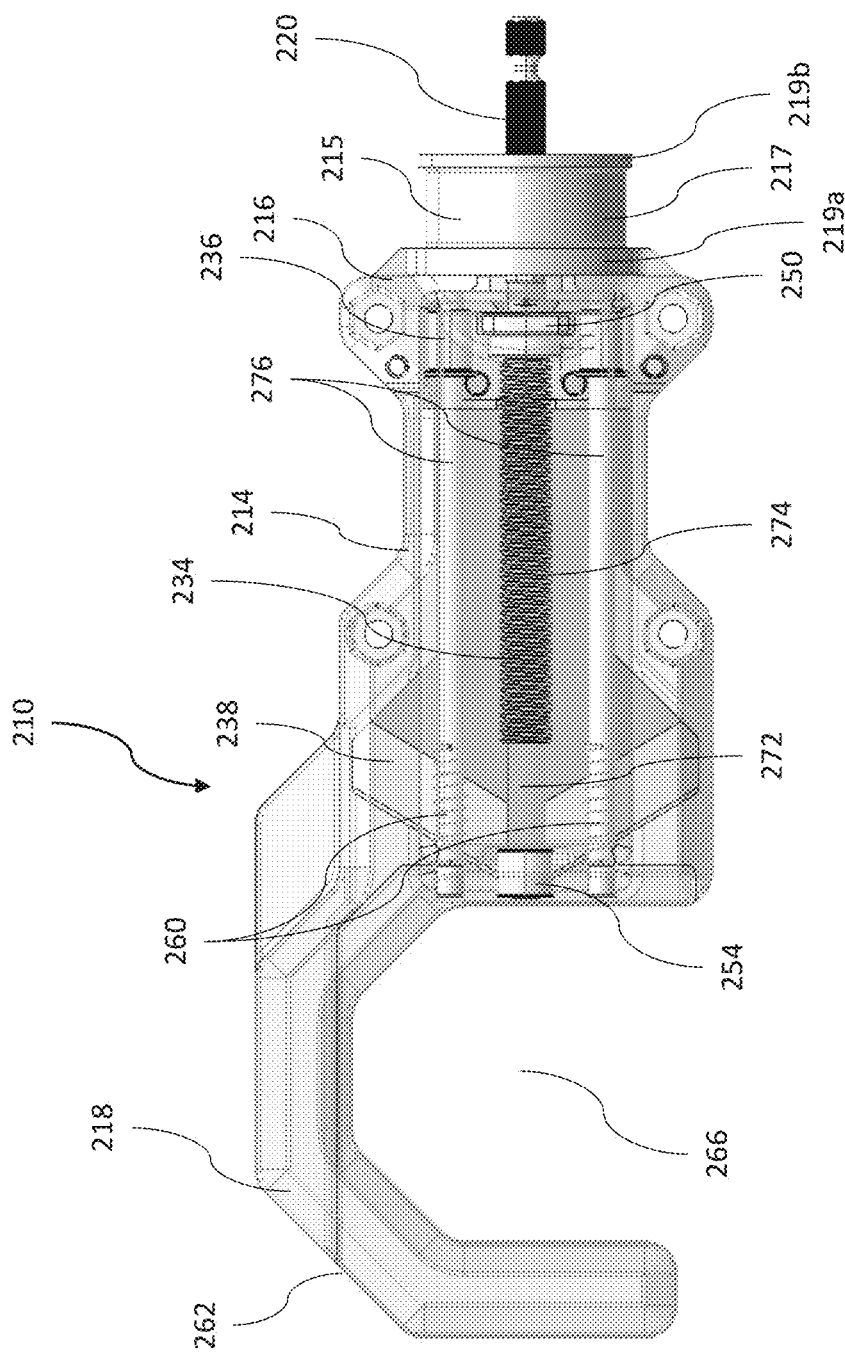
FIGS. 19-22 are side views, partially in cross-section, of another implementation of a power tool accessory for cutting elongated members.
Figure 20:
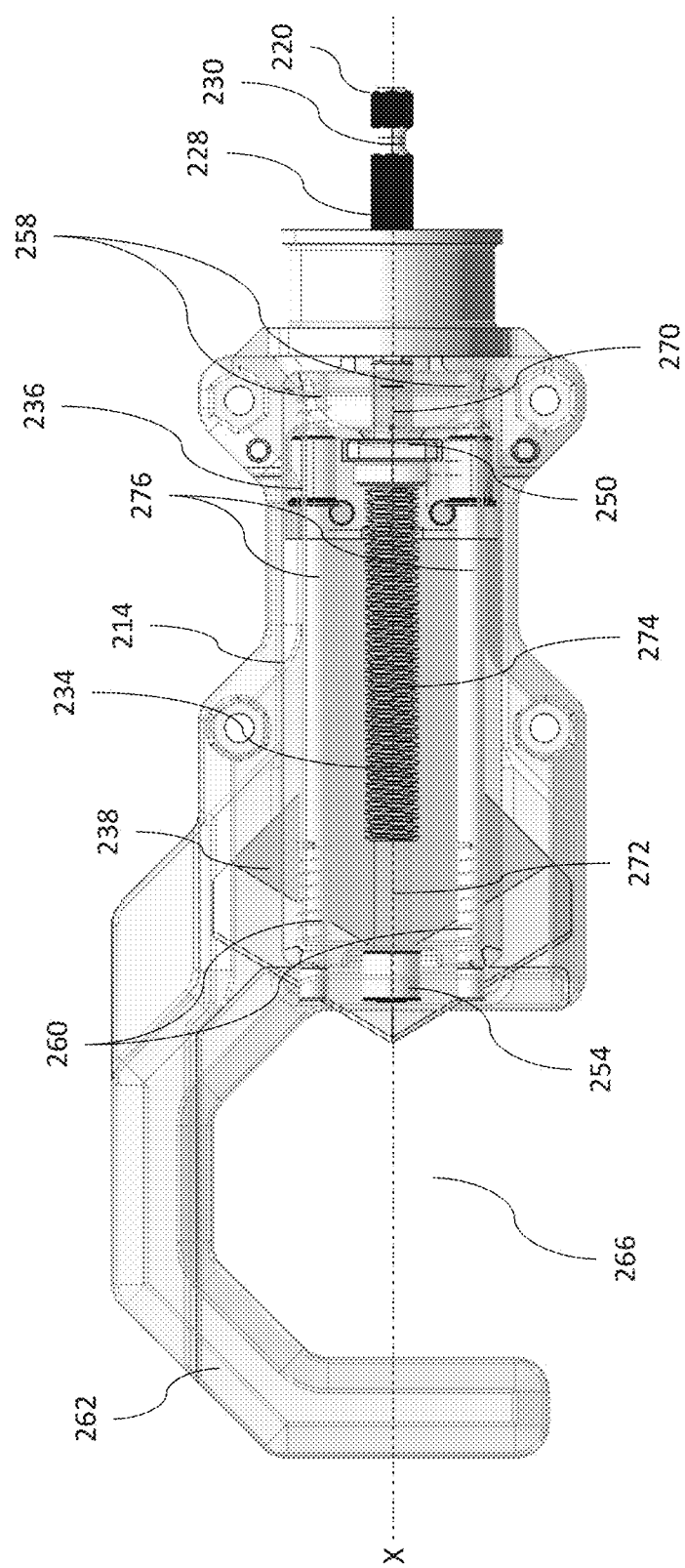
Figure 21:
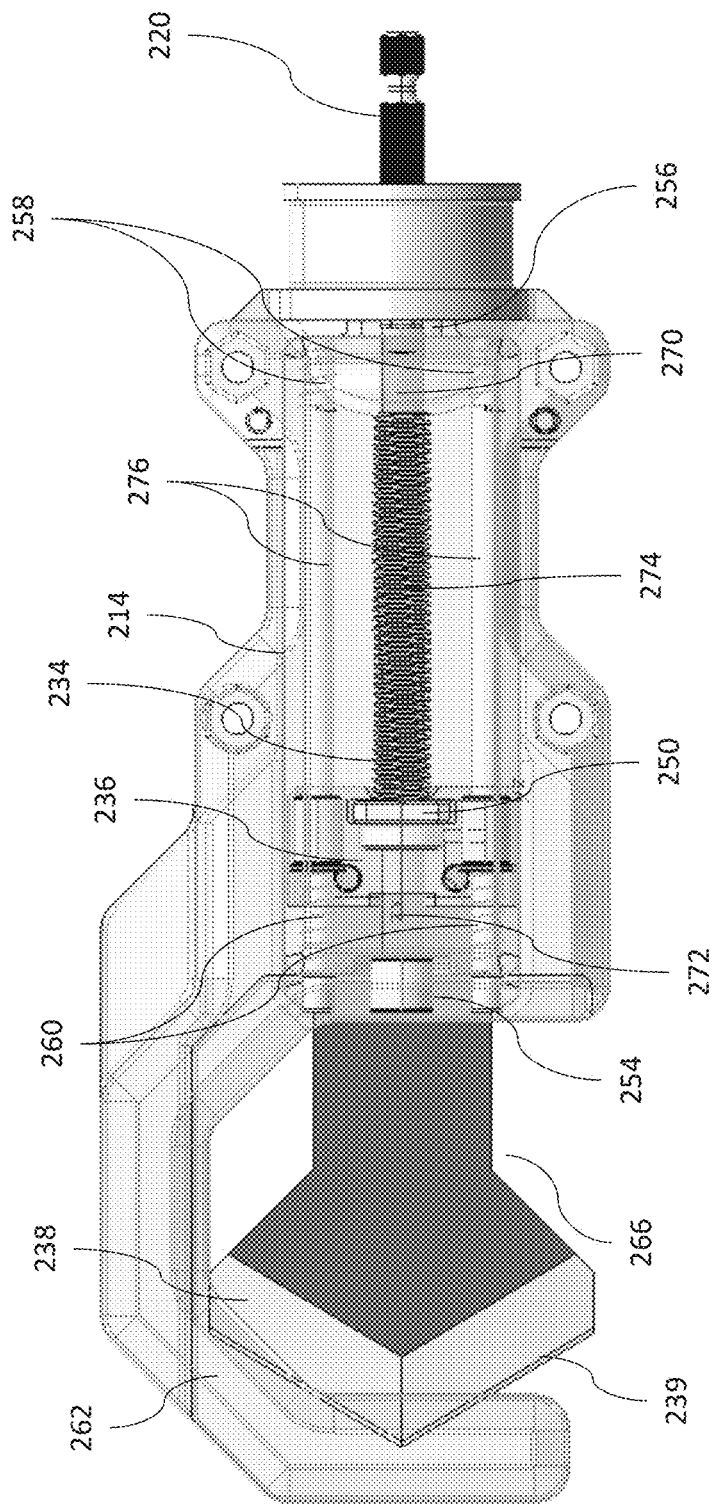

In operation, if the blade 238 is not already fully retracted (as shown in FIG. 19), the input shaft 220 is coupled to the tool holder of a rotary power tool and the power tool is run in the reverse (e.g., counterclockwise) direction to retract the blade 238 as far as possible axially rearward into the housing 214 (FIG. 19). In this position, the blade 238 is fully retracted into the housing 214, and the nut 250 is disengaged from the threads on the intermediate threaded portion 274 of the rod and received over the unthreaded rear portion 270, while the rear compression springs 258 are compressed. The elongated member to be cut is then inserted into the recess 266 in the workpiece holder 262. Next, the power tool is activated to run in the forward (e.g., clockwise) direction. Upon rotation of the input shaft 220 in the forward (e.g., clockwise) direction, the threaded shaft 234 rotates relative to the nut 250. The rear compression springs 258 push the mounting block 236, nut 250, and blade 238 axially forward so that the nut catches on and engages the threads on the intermediate threaded portion 274 of the threaded rod 234 (FIG. 20). As the input shaft 220 continues to rotate in the forward (e.g., clockwise) direction, the mounting block 236, nut 250, and blade 238 move axially forward along the intermediate threaded portion of the rod and the guide rods to the position shown in FIG. 21. This pushes the blade 238 into and through the recess 266 in the front receiving portion 262, causing the blade 238 to cut a pipe or other elongated workpiece received in the front receiving portion 262. As the blade completes the cut, the mounting block 236, nut 250, and blade 238 continue moving axially forward until the nut 250 disengages from the intermediate threaded portion 270 and is received over the unthreaded front portion 272 of the threaded rod 234, compressing the front compression springs 260. (FIG. 21) After the cut is complete, the blade can be retracted by running the power tool in reverse (e.g., counterclockwise), causing the input shaft 220 and threaded shaft 234 to rotate in the reverse (e.g., counterclockwise) direction. The front compression springs 260 push the mounting block 236, nut 250, and blade 238 axially rearward so that the nut 250 catches on and engages the threads on the intermediate threaded portion 274 of the threaded rod 234 (FIG. 21). The input shaft 220 then continues to rotate in the reverse (e.g., counterclockwise) direction until the blade returns to the fully retracted position (FIG. 19).

Referring to FIGS. 26-32B, in another implementation, a power tool accessory 310 for cutting elongated members includes a housing 314 having a rear end portion 316 and a front end portion 318, and an input shaft 320 received in the rear end portion 316 of the housing 314. The housing 314 may be formed of two clamshell halves 314a, 314b that are fastened together using lateral threaded fasteners. The input shaft 320 extends along an axis X and is configured to be coupled to a rotary power tool, e.g., a corded or cordless drill or an impact driver 302, to be driven in rotation. The impact driver 302 includes a tool holder 304 that provides for coupling of output tools and/or accessories to an output device of the tool 302, the power tool accessories described herein. The example impact driver 302 includes a housing 306, in which components such as, for example, a motor, a transmission, a rotary impact or Pott-style impact mechanism (not shown) and the like are housed. The transmission and impact mechanism transmit a rotary impact force to the output tool and/or accessory coupled at the tool holder 304 to perform an operation on a workpiece. The tool holder 304 may comprise a quick-release hex receptacle and is provided at an end portion of the power tool housing 306, corresponding to a working end of the impact driver. A trigger 308 for triggering operation of the tool 302 is provided at a handle portion 303 of the housing 306. One or more selection devices 305 may be provided at the outside of the housing 306 to provide for user control of the example power-driven tool 302. For example, the one or more selection devices 305 can be manipulated by the user to turn the tool 302 on and off, to set an operation mode, to set an operational speed, an operational direction and the like.

Figure 26:
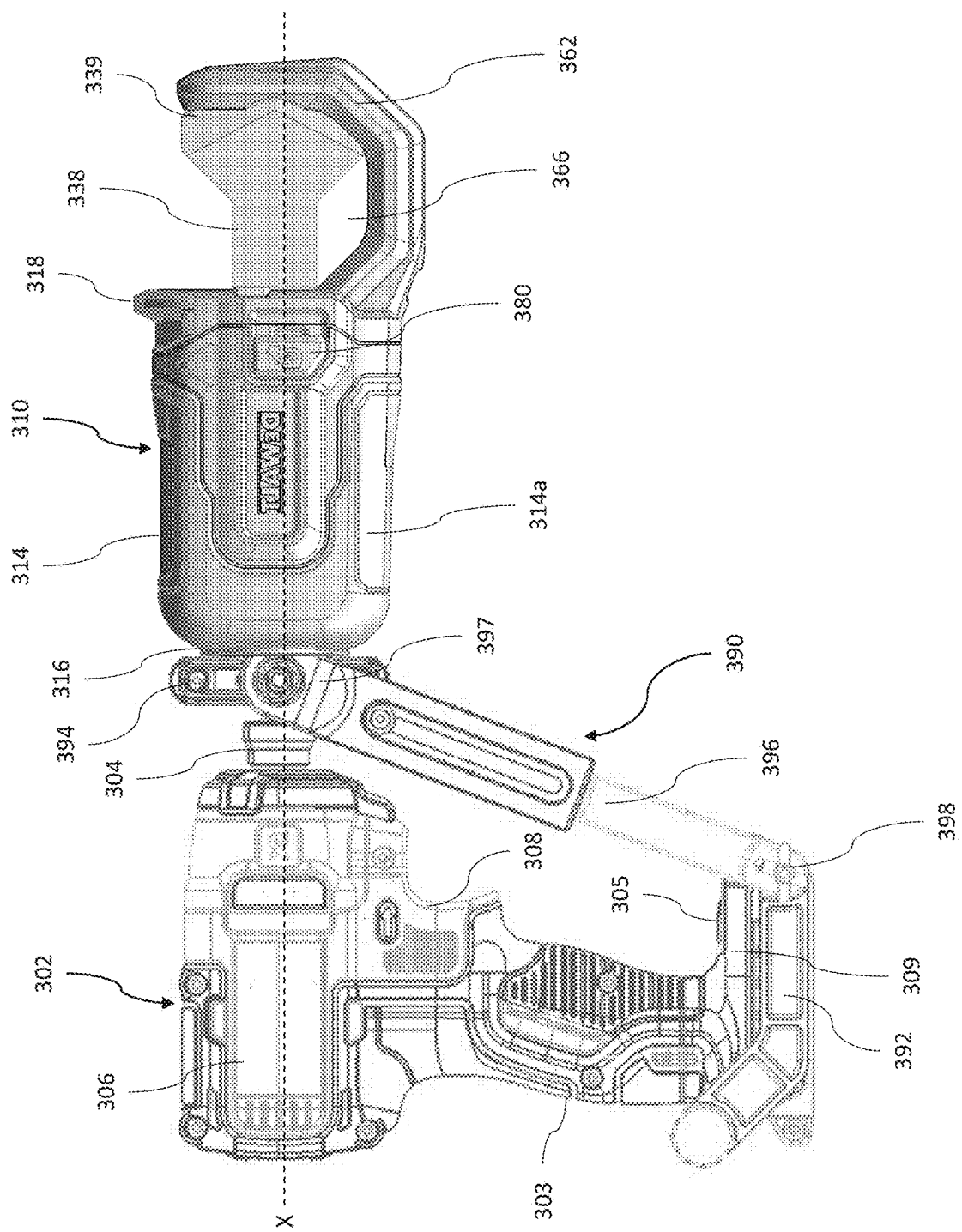
FIG. 26 is a perspective view of another implementation of a power tool accessory together with a power tool and brace.
Figure 27:
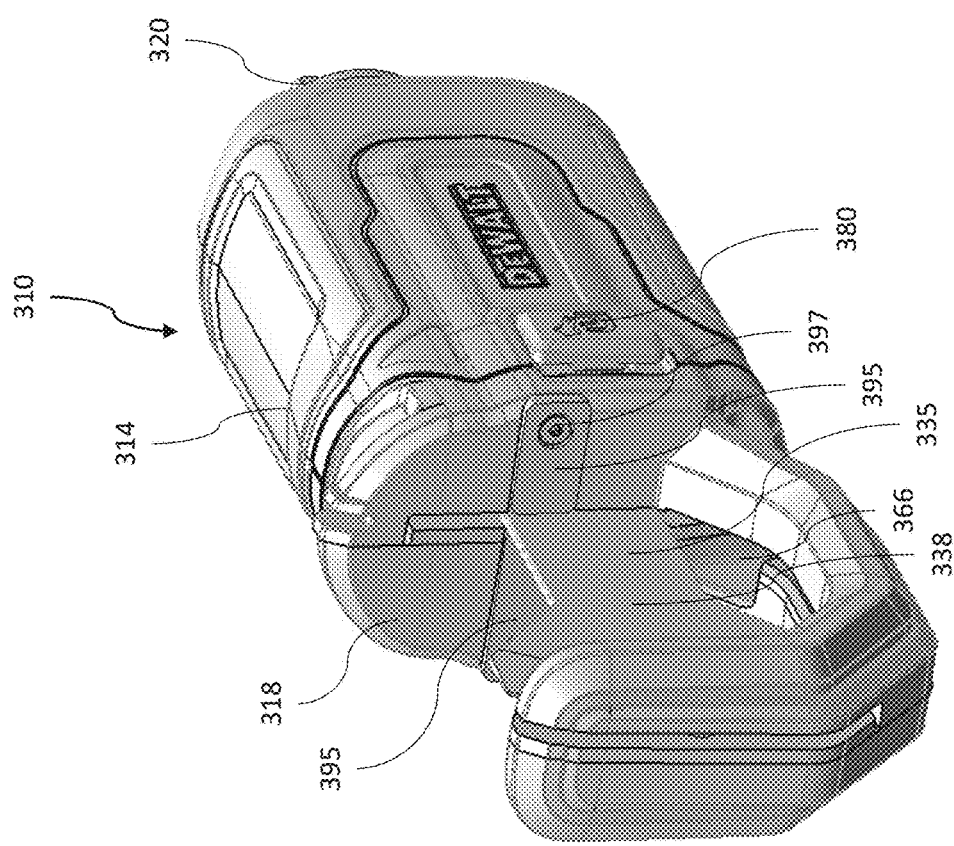
FIG. 27 is a perspective view of the accessory of FIG. 26.
Figure 28B:
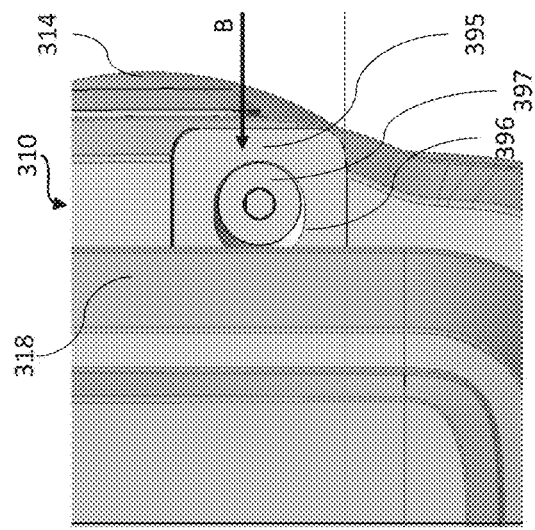
FIGS. 28A-28D are close-up perspective views of a wear plate of the accessory of FIG. 26.
Figure 28D:
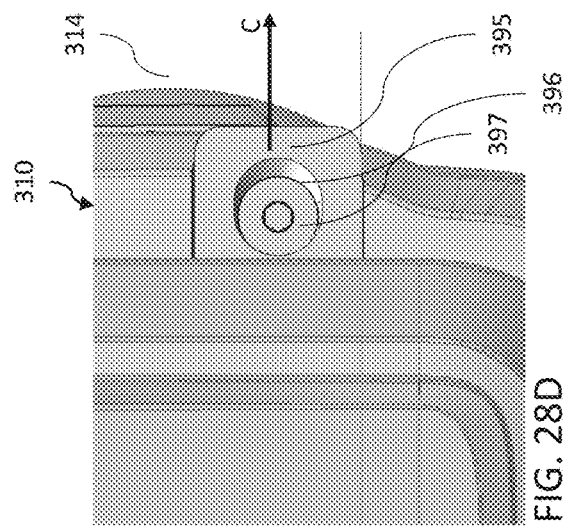
Figure 28A:
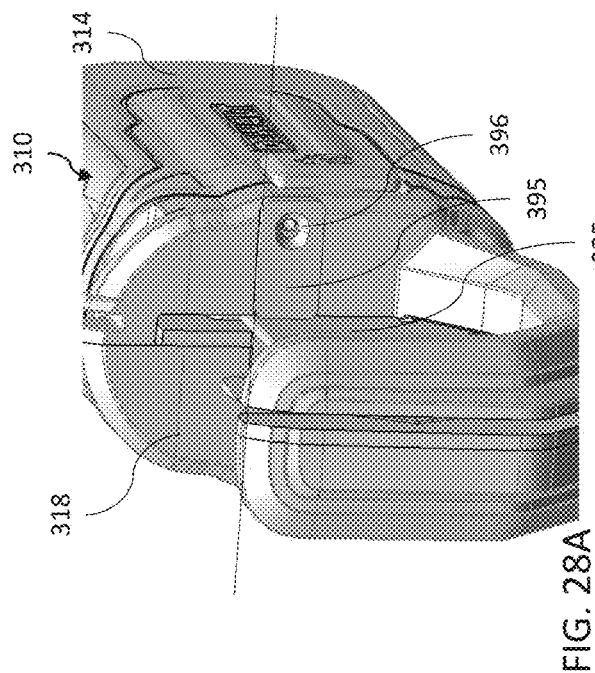
Figure 28C:
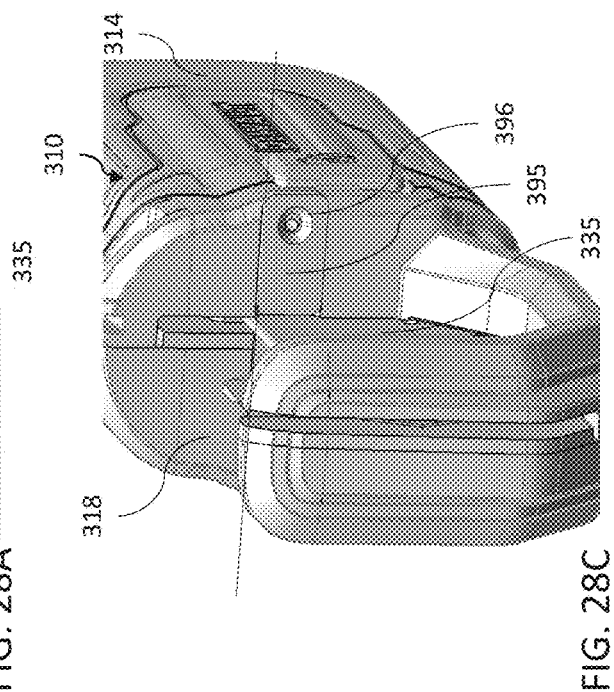
Figure 29A:
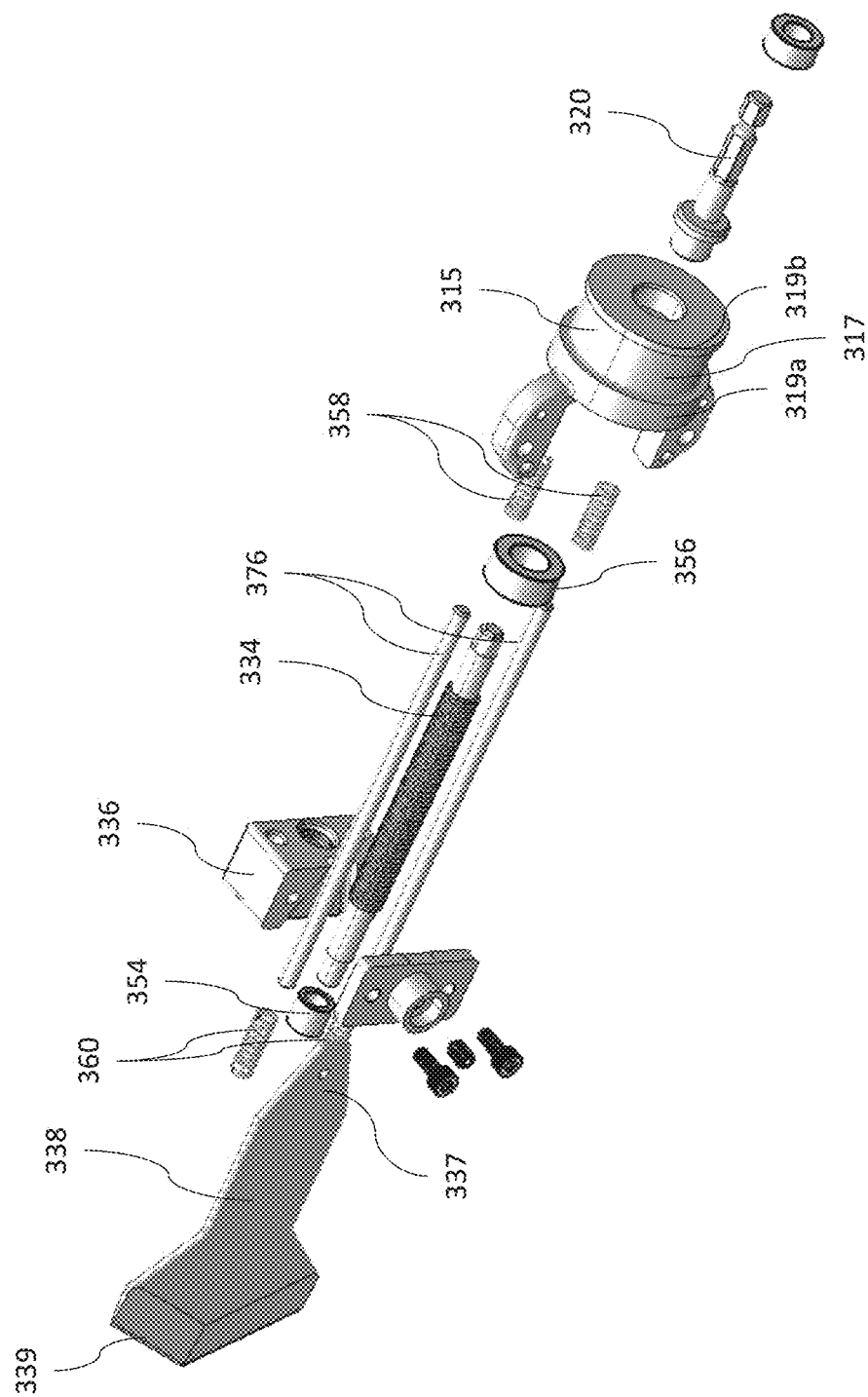
FIG. 29A is an exploded perspective view of the power tool accessory of FIG. 26 with the housing removed.
Figure 29B:
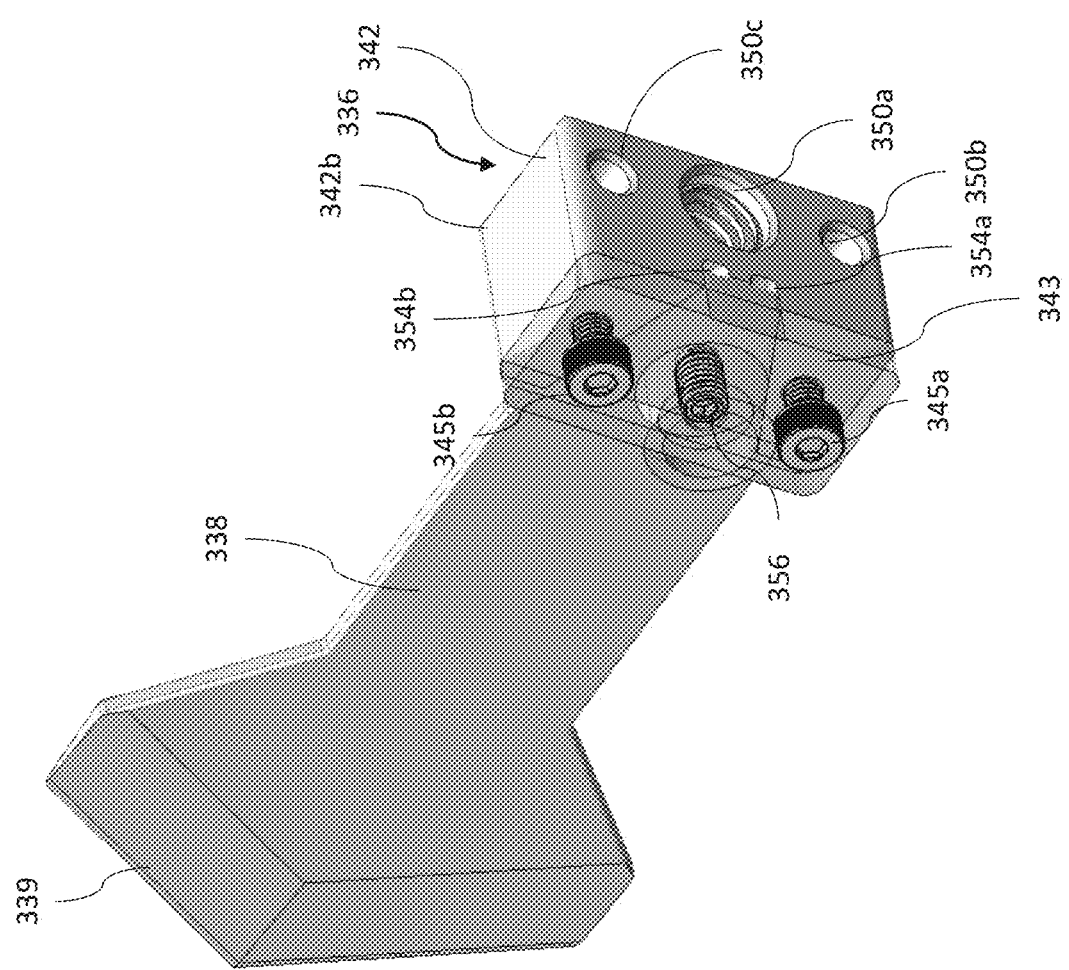
FIG. 29B is a perspective view of the blade and blade holder of the power tool accessory of FIG. 26.
Figure 29C:
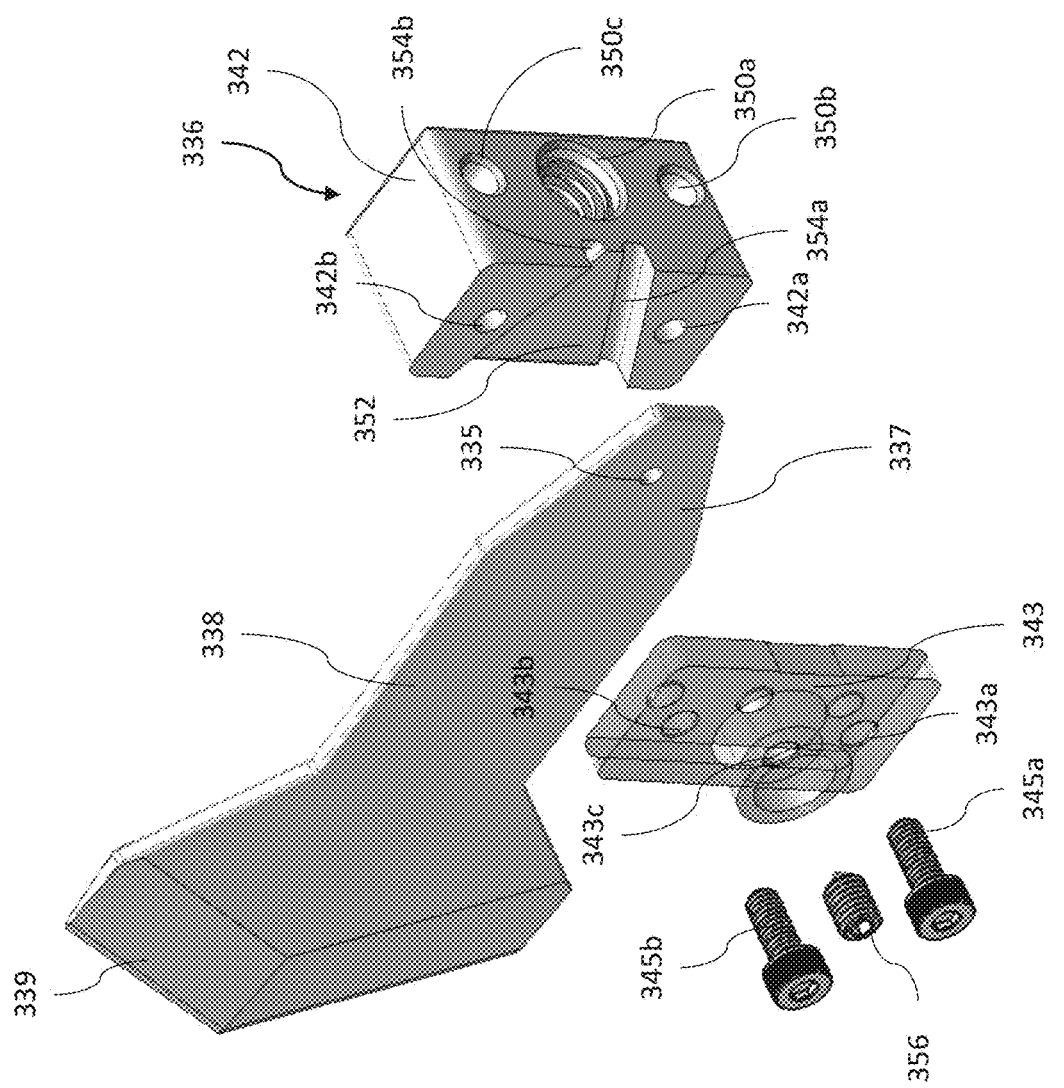
FIG. 29C is an exploded perspective view of the blade and blade holder of FIG. 29B.
Figure 31:
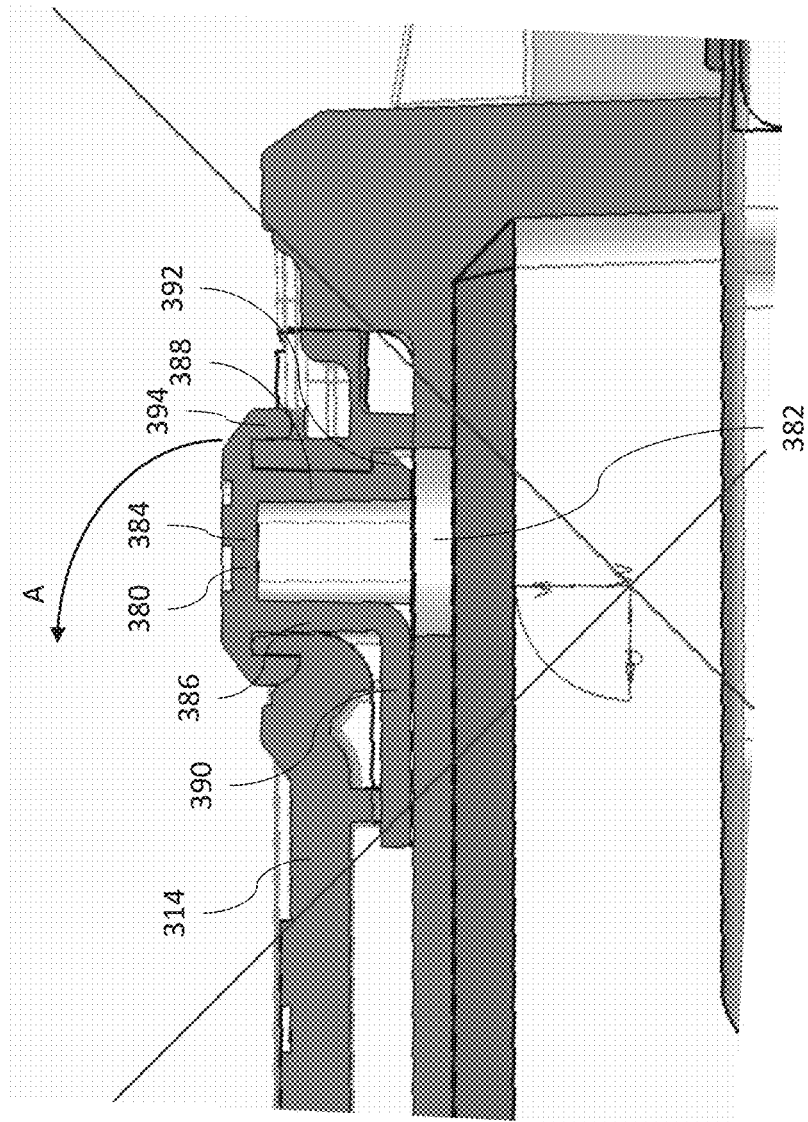
Figure 32A:
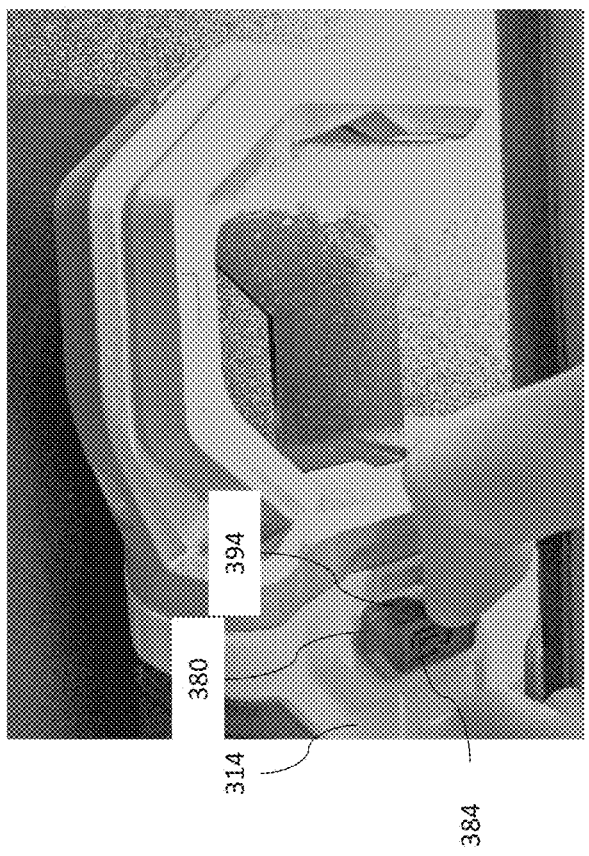
FIGS. 32A and 32B are perspective view of the access port cover of the power tool of FIG. 26 being opened.
Figure 32B:
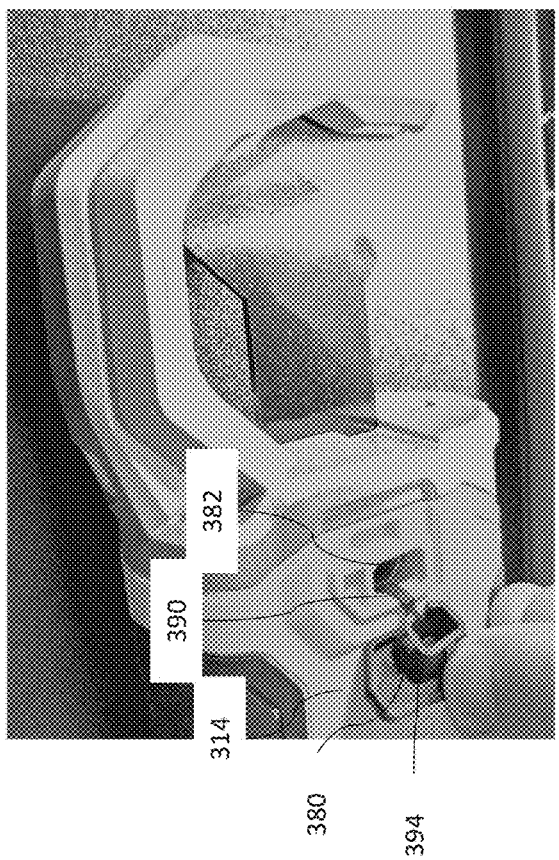

The power tool accessory 310 may be provided with an angled brace assembly 390, similar to one of the braces described and shown in commonly-owned U.S. Pat. No. 9,701,032, U.S. Provisional Application No. 63/175,938, filed Apr. 16, 2021, titled "Power Tool Accessory System with Brace," 63/217,874, filed Jul. 2, 2021, titled "Power Tool Accessory System with Brace," and U.S. Provisional Application No. 63/263,419, filed Nov. 2, 2021, titled "Power Tool Accessory System with Brace," each of which is incorporated by reference. The brace assembly 390 may include a clamping assembly 392 configured to be removably and rigidly attached to a base portion 307 of the handle portion 303 and a collar 394 configured to be coupled to a rear end of an accessory housing 314. An arm assembly 396 has a first end portion 397 pivotally coupled to the collar 394 and an opposite second end portion 398 coupled to the clamping assembly 392. The accessory housing 314 may include an extension portion 315 (see, e.g., FIG. 30A). In some examples, the extension 315 may be substantially cylindrical. The extension 315 may include a coupling portion 317 between a first flange 319a and a second flange 319b. When coupling the brace assembly 390 (or one of the other brace assemblies disclosed in the aforementioned patent and patent applications) to the power tool accessory housing 314, the collar 394 may be coupled to the coupling portion 317 and received between the first and second flanges 319a, 319b. FIG. 26 illustrates the brace assembly 390 coupled to the power-driven tool 302 via the clamping assembly 392, and the collar 394 coupled between the first end portion 397 of the arm assembly 396 and the power tool accessory housing 314. Further details of the brace assembly and other implantations of the brace assembly may be found in the aforementioned patent and patent applications.

Similar to the power tool accessory 210, the input shaft 320 of the power tool accessory 310 may have a hex shaped portion 328 with an annular groove 330 to facilitate coupling to a quick release tool bit holder 304 on the power tool 302. Integral with the front end 318 of the housing 318 is a workpiece holder 362 having a concave recess 366 configured to hold an elongated member to be cut. Inside the housing 314 are a threaded shaft 334, a pair of unthreaded guide rods 376, a front bearing 354, a rear bearing 356, a pair of rear compression springs 358, and a pair of front compression springs 360, similar to the corresponding components in the power tool accessory 210.

Like the power tool accessory 210, the power tool accessory 310 includes a blade holder 336 with a lock assembly configured to removably hold a cutting blade 338 and received over the threaded shaft 334 for axially movement along the threaded shaft 334. The blade holder 336 and the blade 338 differ from the blade holder 236 and the blade 238 in the following respects. The blade 338 has a triangular or wedge shaped front cutting edge 339 and a triangular tang 337 at its rear end with one lateral hole 335. The blade holder 336 includes a clamping block 342 and a lock assembly in the form of a clamping plate 343 removably fastenable to the block 342 by a pair of threaded fasteners 345a, 345b receivable through lateral openings 343a, 343b in the clamping plate 343 and lateral openings 342a, 342b in the block 342. The block 342 includes a central longitudinal threaded bore 350a that receives the threaded rod 334 and two longitudinal unthreaded bores 350b, 350c that receive the unthreaded guide rods 376. Rotation of the threaded rod 334 causes the blade holder 336 to move axially along the threaded rod 334 and guide rods 376 in a manner similar to blade holder 236, described above. The clamping block 342 also includes a triangular recess 352 bounded by angled grooves 354a, 354b for receiving the triangular tang 337 of the blade 338. The clamping plate 343 includes a central threaded aperture 343c that receives a user-adjustable set screw 356. The set screw 356 engages the lateral hole 335 in the blade 338 and is adjustable to clamp the blade 338 between the clamping plate 343 and the clamping block 342. Loosening the set screw 356 also allows the blade 338 to removed from the blade holder 336 to change the blade.

Coupled to the housing 314 over the head of the set screw 356 is a door 380 covering an access port 382. The door is made of a resilient or elastomeric material has a pi-shaped cross-section with a top wall 384 and first and second legs 386, 388. The first leg 386 is coupled to the housing 314 via a living hinge 390, while the second leg 388 is removably coupled to the housing by a barb 392. The door 380 can be opened to expose the access port 382 by lifting a front edge 394 of the top wall 384 closest to the second leg 388 to disengage the barb 392 from the housing 314 and rotating the door 380 about the living hinge 390 along arrow A. Opening the door 380 allows the user to loosen the set screw 356 to change the blade.

Also coupled to the front end 318 of the housing 314 are one or more wear plates 395 that abut one or both side surfaces 335 of the blade 338. The wear plates 395 each include an oblong opening 396 that receive a set screw 397, which is received in a threaded opening in the front end 318 of the housing 314. The wear plates 395 can be user-adjusted a small amount toward (along arrow B) and away (along arrow C) from the side surfaces 335 of the blade 338 by loosening the set screw 397 and changing the lateral position of the wear plates 395 relative to the blade 338. The wear plates 395 help keep the blade centered in the concave recess 366 and can also be adjusted to accommodate different thicknesses of blades 335.

In operation, the input shaft 320 of the power tool accessory 310 is coupled to the tool holder 304 of the rotary power tool 302 and the clamp 394 of the brace assembly 390 is coupled to the rear end 315 of the power tool accessory housing 314. If the blade 338 is not already fully retracted, and the power tool is run in the reverse (e.g., counterclockwise) direction to retract the blade 338 as far as possible axially rearward into the housing 314. Once the blade is fully retracted, the power tool may be activated to run in the forward (e.g., clockwise) direction. Upon rotation of the input shaft 320 in the forward (e.g., clockwise) direction, the threaded shaft 334 rotates, causing the mounting block 336 and blade 338 to move axially forward along the guide into and through the recess 366 in the front receiving portion 362, causing the blade 338 to cut a pipe or other elongated workpiece received in the front receiving portion 362.

The above described power tool accessories may be used with a rotary power tool for cutting various diameters of elongated members, including rods and tubular members such as PVC pipe. This provides the user with the convenience of a power tool accessory that can cut such elongated members using a rotary power tool that the user already owns without having the purchase a dedicated power tool for this operation.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A power tool accessory for cutting elongated members comprising:
   a housing having a rear end portion and a front end portion;
   an input shaft at least partially received in the rear end portion, extending along an axis, and configured to be coupled to a tool holder of a rotary power tool;
   an at least partially threaded shaft received in the housing and rotationally driven by the input shaft;
   a blade holder configured to move axially upon rotation of the at least partially threaded shaft;
   an unthreaded guide rod extending generally parallel to the at least partially threaded shaft and configured to be received in an unthreaded opening in the blade holder;
   a cutting blade configured to be retained by the blade holder; and
   a workpiece holder coupled to the front end portion of the housing and configured to receive an elongated member, wherein, upon rotation of the input shaft in a first direction, the at least partially threaded shaft rotates, causing the blade to move axially at least partially into the workpiece holder to cut the elongated member.

2. The accessory of claim 1, wherein, upon rotation of the input shaft in a second direction opposite the first direction, the at least partially threaded shaft rotates causing the blade holder to move along the axis toward the rear end portion of the housing and causing the blade to be retracted at least partially into the housing and out of the workpiece holder.

3. The accessory of claim 1, wherein the workpiece holder is generally C-shaped with a concave recess for receiving the workpiece to be cut.

4. The accessory of claim 1, wherein the blade holder includes an opening configured to receive at least a portion of the at least partially the threaded shaft.

5. The accessory of claim 4, wherein the blade holder includes a threaded nut received over the at least partially threaded shaft such that rotation of the at least partially threaded shaft causes the blade holder to be moved axially relative to the housing upon rotation of the input shaft.

6. The accessory of claim 4, wherein the blade holder includes a threaded opening that receives the at least partially threaded shaft such that rotation of the at least partially threaded shaft causes the blade holder to be moved axially relative to the housing upon rotation of the input shaft.

7. The accessory of claim 1, further comprising a first spring configured to bias the blade holder away from the front end portion of the housing as the blade holder moves axially toward the front end portion of the housing.

8. The accessory of claim 7, further comprising a second spring configured to bias the blade holder away from the rear end portion of the housing as the blade holder moves axially toward the rear end portion of the housing.

9. The accessory of claim 1, wherein the at least partially threaded shaft includes a front unthreaded portion, a rear unthreaded portion, and an intermediate threaded portion between the front and rear unthreaded portions, and further comprising a first spring configured to bias the blade holder toward the intermediate threaded portion when the blade holder approaches the front unthreaded portion, and a second spring configured to bias the blade holder toward the intermediate threaded portion when the blade holder approaches the rear unthreaded portion.

10. The accessory of claim 1, wherein the blade holder includes a clamping block and a lock configured to retain the blade in the blade holder.

11. The accessory of claim 10, wherein the lock includes a clamping plate coupled to the clamping block with a tang of the blade received between the clamping block and the clamping plate.

12. The accessory of claim 11, wherein a recess is defined in at least one of the clamping block and the clamping plate for receiving the tang of the blade.

13. The accessory of claim 11, wherein the lock is accessible through the housing to release the blade from the blade holder.

14. The accessory of claim 13, wherein the lock includes at least one of a quick release actuator button or a set screw.

15. The accessory of claim 1, further comprising a brace assembly including a base configured to be removably coupled to a housing of a rotary power tool, a collar configured to be removably coupled to the housing of the accessory, and an arm assembly having a first end coupled to the base and a second end coupled to the collar.

16. The accessory of claim 15, wherein the housing of the accessory includes a substantially cylindrical extension portion configured to receive the collar.

17. The accessory of claim 16, wherein the wear plate is laterally adjustable relative to the side surface of the blade.

18. The accessory of claim 1, wherein the housing of the accessory further includes at least one wear plate configured to engage a side surface of the blade.

19. A power tool accessory for cutting elongated members comprising:
 a housing having a rear end portion and a front end portion;
 an input shaft at least partially received in the rear end portion, extending along an axis, and configured to be coupled to a tool holder of a rotary power tool;
 an at least partially threaded shaft received in the housing and rotationally driven by the input shaft;
 a blade holder configured to move axially upon rotation of the at least partially threaded shaft;
 a first spring configured to bias the blade holder away from the front end portion of the housing as the blade holder moves axially toward the front end portion of the housing;
 a cutting blade configured to be retained by the blade holder; and
 a workpiece holder coupled to the front end portion of the housing and configured to receive an elongated member,
 wherein, upon rotation of the input shaft in a first direction, the at least partially threaded shaft rotates, causing the blade to move axially at least partially into the workpiece holder to cut the elongated member.

20. The accessory of claim 19, further comprising a second spring configured to bias the blade holder away from the rear end portion of the housing as the blade holder moves axially toward the rear end portion of the housing.

21. The accessory of claim 19, wherein, upon rotation of the input shaft in a second direction opposite the first direction, the at least partially threaded shaft rotates causing the blade holder to move along the axis toward the rear end portion of the housing and causing the blade to be retracted at least partially into the housing and out of the workpiece holder.

22. The accessory of claim 19, wherein the blade holder includes an opening configured to receive at least a portion of the at least partially the threaded shaft.

23. The accessory of claim 22, wherein the blade holder includes a threaded nut received over the at least partially threaded shaft such that rotation of the at least partially threaded shaft causes the blade holder to be moved axially relative to the housing upon rotation of the input shaft.

24. The accessory of claim 22, wherein the blade holder includes a threaded opening that receives the at least partially threaded shaft such that rotation of the at least partially threaded shaft causes the blade holder to be moved axially relative to the housing upon rotation of the input shaft.

25. The accessory of claim 19, wherein the housing of the accessory further includes at least one wear plate configured to engage a side surface of the blade.

26. The accessory of claim 25, wherein the at least one wear plate is laterally adjustable relative to the side surface of the blade.

27. The accessory of claim 19,
 wherein the blade holder includes a clamping block and a lock configured to retain the blade in the blade holder.

28. The accessory of claim 27, wherein the lock includes a clamping plate coupled to the clamping block with a tang of the blade received between the clamping block and the clamping plate.

29. The accessory of claim 28, wherein a recess is defined in at least one of the clamping block and the clamping plate for receiving the tang of the blade.

30. The accessory of claim 28, wherein the lock is accessible through the housing to release the blade from the blade holder.

31. The accessory of claim 30, wherein the lock includes at least one of a quick release actuator button or a set screw.

32. A power tool accessory for cutting elongated members comprising:
- a housing having a rear end portion and a front end portion;
- an input shaft at least partially received in the rear end portion, extending along an axis, and configured to be coupled to a tool holder of a rotary power tool;
- an at least partially threaded shaft received in the housing and rotationally driven by the input shaft;
- a blade holder configured to move axially upon rotation of the at least partially threaded shaft;
- a cutting blade configured to be retained by the blade holder; and
- a workpiece holder coupled to the front end portion of the housing and configured to receive an elongated member,
- wherein the at least partially threaded shaft includes a front unthreaded portion, a rear unthreaded portion, and an intermediate threaded portion between the front and rear unthreaded portions, and further comprising a first spring configured to bias the blade holder toward the intermediate threaded portion when the blade holder approaches the front unthreaded portion, and a second spring configured to bias the blade holder toward the intermediate threaded portion when the blade holder approaches the rear unthreaded portion, and
- wherein, upon rotation of the input shaft in a first direction, the at least partially threaded shaft rotates, causing the blade to move axially at least partially into the workpiece holder to cut the elongated member.

33. The accessory of claim 32, wherein, upon rotation of the input shaft in a second direction opposite the first direction, the at least partially threaded shaft rotates causing the blade holder to move along the axis toward the rear end portion of the housing and causing the blade to be retracted at least partially into the housing and out of the workpiece holder.

34. The accessory of claim 32, wherein the blade holder includes an opening configured to receive at least a portion of the at least partially the threaded shaft.

35. The accessory of claim 34, wherein the blade holder includes a threaded nut received over the at least partially threaded shaft such that rotation of the at least partially threaded shaft causes the blade holder to be moved axially relative to the housing upon rotation of the input shaft.

36. The accessory of claim 34, wherein the blade holder includes a threaded opening that receives the at least partially threaded shaft such that rotation of the at least partially threaded shaft causes the blade holder to be moved axially relative to the housing upon rotation of the input shaft.

37. The accessory of claim 32, wherein the housing of the accessory further includes at least one wear plate configured to engage a side surface of the blade.

38. The accessory of claim 37, wherein the wear plate is laterally adjustable relative to the side surface of the blade.

39. A power tool accessory for cutting elongated members comprising:
- a housing having a rear end portion and a front end portion;
- a brace assembly including a base configured to be removably coupled to a housing of a rotary power tool, a collar configured to be removably coupled to the housing of the accessory, and an arm assembly having a first end coupled to the base and a second end coupled to the collar;
- an input shaft at least partially received in the rear end portion, extending along an axis, and configured to be coupled to a tool holder of a rotary power tool;
- an at least partially threaded shaft received in the housing and rotationally driven by the input shaft;
- a blade holder configured to move axially upon rotation of the at least partially threaded shaft;
- a cutting blade configured to be retained by the blade holder; and
- a workpiece holder coupled to the front end portion of the housing and configured to receive an elongated member,
- wherein, upon rotation of the input shaft in a first direction, the at least partially threaded shaft rotates, causing the blade to move axially at least partially into the workpiece holder to cut the elongated member.

40. The accessory of claim 39, wherein the housing of the accessory includes a substantially cylindrical extension portion configured to receive the collar.

* * * * *